(12) United States Patent
Benyamin et al.

(10) Patent No.: US 6,721,489 B1
(45) Date of Patent: Apr. 13, 2004

(54) PLAY LIST MANAGER

(75) Inventors: Daniel Benyamin, Oakland, CA (US);
Dannie C. Lau, Santa Clara, CA (US);
Brendan T. Dowling, Malibu, CA (US)

(73) Assignee: PhatNoise, Inc., Los Angeles, CA (US)

( * ) Notice: Subject to any disclaimer, the term of this patent is extended or adjusted under 35 U.S.C. 154(b) by 0 days.

(21) Appl. No.: 09/521,874

(22) Filed: Mar. 8, 2000

(51) Int. Cl.⁷ .................... H04N 5/91; G11B 27/00
(52) U.S. Cl. ............................. 386/46; 386/55
(58) Field of Search .................. 386/46, 1, 4, 6, 386/52, 55, 69, 68, 83, 104, 105, 106, 125; 369/30.01; 360/13; H04N 5/91; G11B 27/00

(56) References Cited

U.S. PATENT DOCUMENTS

| 5,173,888 A | 12/1992 | An .................... 369/33 |
| 5,390,027 A | 2/1995 | Henmi et al. |
| 5,408,449 A | 4/1995 | Oh .................... 369/32 |
| 5,541,738 A | 7/1996 | Mankovitz |
| 6,016,522 A | 1/2000 | Rossum ............... 710/52 |
| 6,055,478 A | 4/2000 | Heron ................. 701/213 |
| 6,084,581 A | * 7/2000 | Hunt |
| 6,320,111 B1 | * 11/2001 | Kizaki |

OTHER PUBLICATIONS

Excerpts from www.empeg.com, 1999.
Clarion AutoPC 310C Owner's Manual, Clarion Co. Ltd., 1998.
RCA LYRA User's Guide, RD2201/2202/2204, 1999.

* cited by examiner

Primary Examiner—Robert Chevalier

(57) ABSTRACT

A play list manager is disclosed that can be used to create and update play lists. The play lists can be used for audio information, visual information, or a combination of audio and visual information. The user of the play list manager creates a play list and specifies certain criteria for automatically adding tracks to the play list. When a new track is added to the environment, the system tests whether the track's properties satisfy the criteria for the play list. If so, the new track is automatically added to the play list. In one alternative, a user can select a predefined play list, whose criteria has already been created. Upon selection of the predefined play list, the play list manager accesses each track and adds the track to the play list if the track's properties satisfy the criteria for the predefined play list.

51 Claims, 16 Drawing Sheets

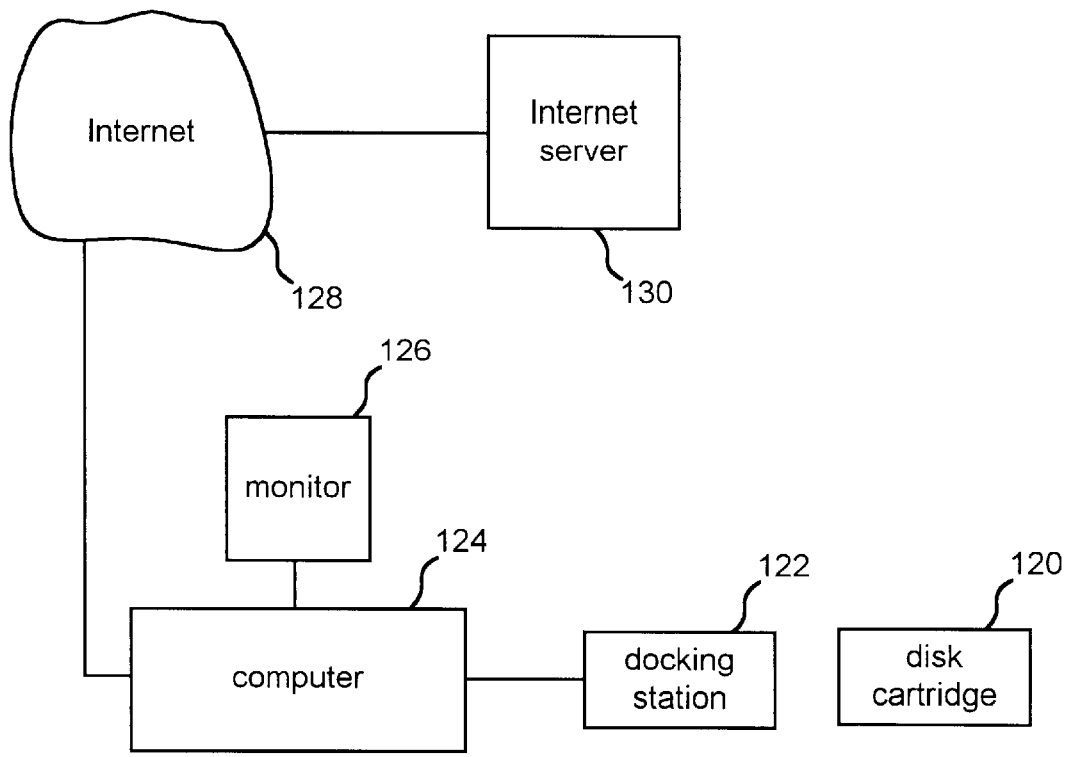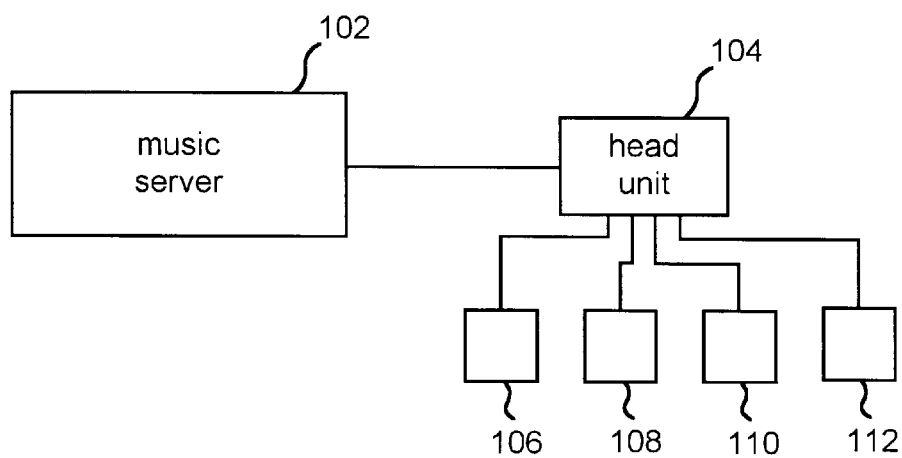
Fig. 1

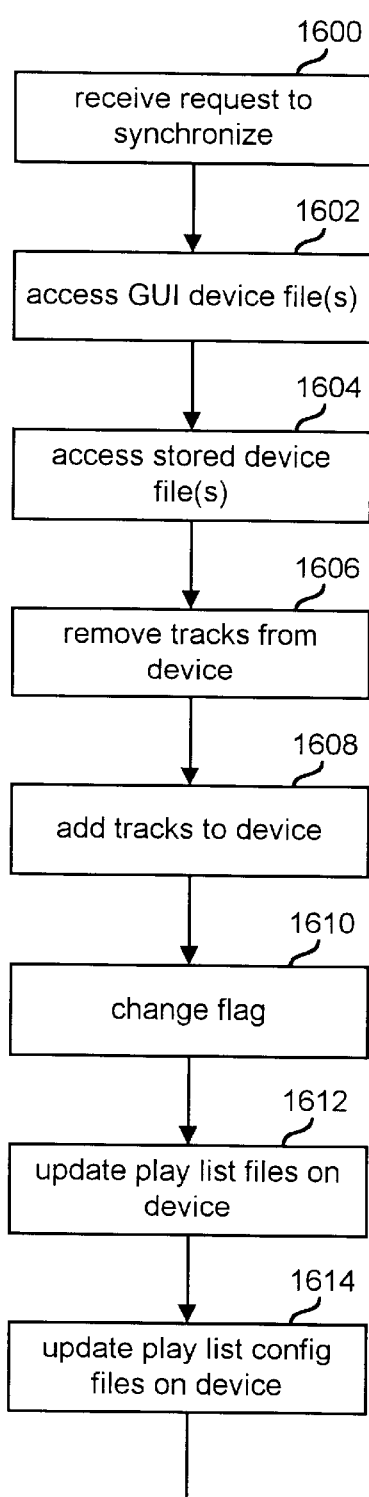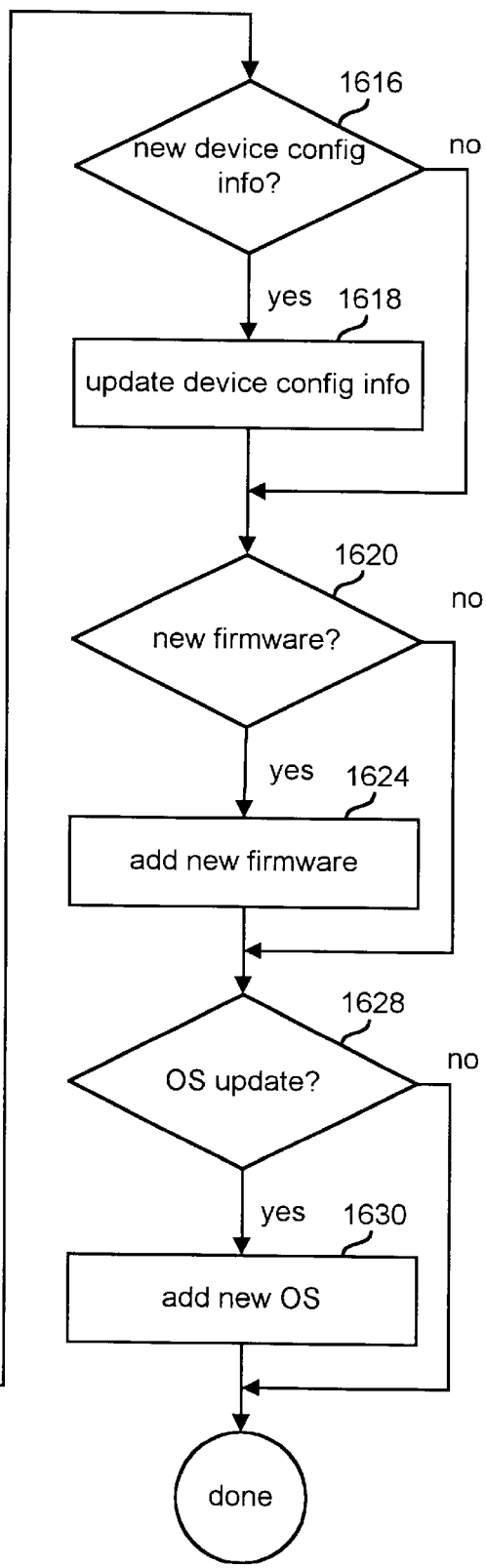
Fig. 19

PLAY LIST MANAGER

CROSS-REFERENCE TO RELATED APPLICATIONS

This Application is related to the following Applications:

AUDIO/VISUAL SERVER, by Dannie C. Lau, et al., filed the same day as the present application, Ser. No. 09/521,182; and VEHICLE SOUND SYSTEM, by Dannie C. Lau, et al., filed the same day as the present application, Ser. No. 09/521,186.

Each of these related Applications are incorporated herein by reference.

BACKGROUND OF THE INVENTION

1. Field of the Invention

The present invention is directed to a system for managing play lists.

2. Description of the Related Art

Digitally stored music continues to gain popularity. Rather than drive to a store, consumers are downloading music from the Internet and playing music on a computer or on a digital music player. An example of a digital music player is the Rio digital music player from Diamond Multimedia. This music player includes a flash memory for storing music and electronics for playing the music. One advantage of digital music is that the storage medium is writeable. Thus, the user can choose what songs to play and write those songs to the music player's storage medium. On the other hand, audio compact discs are not writeable. In addition to the versatility offered by digital music, there is a huge variety of music available to be downloaded through the Internet. With the acceptance of a standard for compressed audio files, digital music has soared in popularity.

Users of digital music technology can acquire large amounts of digital music files. In order to manage these files, play lists are created. For example, a play list may be a list of songs to be played by a music player. Play lists allows users to group their songs according to whatever method the user desires and plays the tracks referenced by the play list on a music player.

One problem that has been associated with play lists is the enormous effort needed to manage play lists. As the user acquires large amounts of files, managing the play list becomes difficult. A user may have multiple or hundreds of play lists. Additionally, the user may have hundreds or thousands of music files. The effort to move a large number of files into the appropriate play lists is time consuming. Furthermore, as users download new files, the user must remember to add the new tracks to one or more play lists. This two step approach—(1) downloading music files and (2) moving the downloaded files to one or more play lists—is cumbersome. Therefore, many users stop using play lists.

Thus, there is a need for an improved means for managing play lists.

SUMMARY OF THE INVENTION

The present invention, roughly described, provides for a play list manager than can be used to create and update play lists. The play lists can be used for audio information, visual information or a combination of audio and visual information. In one embodiment, a play list stores the names of tracks to be played. The user of the play list manager creates a play list and specifies certain criteria for automatically adding tracks to the play list. When a new track is added to the environment, the system tests whether the track's properties satisfy the criteria for the play list. If so, the new track is automatically added to the play list. In one alternative, a user can select to create or update a predefined play list whose criteria has already been created. Upon selection of the predefined play list, the play list manager accesses each track and automatically adds the track to the play list if the track's properties satisfy the criteria for the predefined play list. In one embodiment, after a play list is created and tracks are added, the tracks on the play list are automatically played.

One embodiment of the present invention includes the steps of comparing a set of one or more properties of a first track to criteria of a first play list and automatically adding the first track to the first play list if the properties of the first track satisfy the criteria of the first play list. One embodiment includes detecting that the first track is available such that the step of comparing is performed automatically in response to the step of detecting. Another embodiment of the present invention includes comparing properties for a first track to play list criteria for a plurality of play lists and automatically adding the first track to each of the play lists having play list criteria satisfied by the properties for the first track. Thus, the method can be used to create or update one play list or multiple play lists. In another embodiment, the present invention includes receiving a request to generate a play list having predefined play list criteria, determining which tracks from a set of tracks have properties satisfying the play list criteria and automatically adding to the play list the tracks having properties satisfying the play list criteria.

The present invention can be implemented using software, hardware or a combination of software and hardware. When all or portions of the present invention are implemented in software, that software can reside on a processor readable storage medium. Examples of an appropriate processor readable storage medium include a floppy disk, a hard disk, CD-ROM, memory or IC, flash memory, etc. In one embodiment, the hardware used to implement the present invention includes an output device (e.g. a monitor, a printer, speakers, etc.), an input device (e.g. a keyboard, pointing device, etc.), a processor, an input interface and a processor readable storage medium. The input interface allows the processor to communicate with a disk drive, network or other device for entering data into the hardware. The processor readable storage medium stores program code capable of programming the processor to perform the steps to implement the present invention. The present invention can be implemented on a desktop computer, network server, as part of a web page on the Internet, another type of computing platform, a head unit, a server, an audio device, a visual device, or any other device suitable for using the present invention.

These and other objects and advantages of the present invention will appear more clearly from the following detailed description in which the preferred embodiment of the invention has been set forth in conjunction with the drawings.

BRIEF DESCRIPTION OF THE DRAWINGS

FIG. 1 is a block diagram of one embodiment of the present invention.

FIG. 9 is a flow chart describing the start up process for the processor.

FIG. 19 is a flow chart describing the process of synchronizing data between the hard disk drive and the software on the computer.

DETAILED DESCRIPTION

Figure 2:
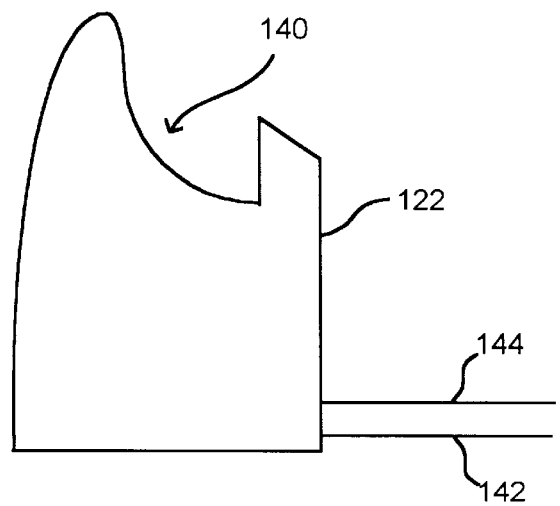
FIG. 2 is the side view of the dock of the present invention.

While the preferred embodiment of the invention is described in regard to an in-vehicle audio system, the present invention can also be used in other contexts and with other types of audio/visual data. For purposes of this patent, audio/visual includes audio alone, visual alone, or a combination of audio and visual. Examples of audio data include music, speech or other sounds. Examples of visual data include video, animation, slide show, text, still images, etc. Thus, the present invention can be used as a server for video data, visual text data, speech data, or any other type of audio/visual data. In one embodiment, the audio/visual data is grouped into tracks. A track could be a song, a message, a story, a video, a scene from a video, etc. The term track is used, therefore, to refer to a grouping of audio/visual data.

FIG. 1 depicts one embodiment of the present invention. FIG. 1 depicts music server 102 which is one embodiment of an audio/visual server. Music server 102 emulates a disc changer. Emulating a disc changer is understood to mean that music server 102 is not an actual disk changer; however, based on the input/output data communication to and from the audio/visual server, music server 102 appears to act like a disc changer. Music server 102 is in communication with head unit 104. In one embodiment, head unit 104 is a standard automobile stereo head unit which is adapted to communicate with a disc changer. Connected to head unit 104 are speakers 106, 108, 110 and 112 for providing music to the user. FIG. 1 also shows removable disk cartridge 120 which can be connected to music server 102 or docking station 122 (also called a dock).

Docking station 122 is connected to computer 124. In one embodiment, docking station 122 connects to a USB port of computer 124. In other embodiments, docking station 122 can connect to a parallel port, serial port, fire wire connection or other interface. In other embodiments, docking station 122 communicates with computer 124 using a wireless connection, including infrared, RF, etc. Alternatively, docking station can be a separate entity on a network communicating to computer 124 over a network.

FIG. 1 shows a monitor 126 connected to computer 124. Computer 124 is a standard personal computer known in the art. For example, computer 124 includes a processor, a memory in communication with the processor, a hard disk drive in communication with the processor, a USB port, a serial port, a parallel port, a network interface (e.g. network card or modem), a keyboard and a pointing device. The keyboard, pointing device and monitor 126 are used to provide and interact with a graphical user interface (GUI) so that a user can add tracks to music server 102. Computer 124 is connected to Internet 128 via a modem, LAN or other means. In one embodiment of the present invention, an Internet server 130 is provided via the Internet for downloading tracks, downloading information about tracks, storing information about tracks and downloading firmware. In one embodiment of the system of FIG. 1, the tracks are songs.

In general, the embodiment shown in FIG. 1 operates as follows. A user will insert disk cartridge 120 into docking station 122. Using the GUI on computer 124, the user will download tracks from the Internet (including Internet server 130) to the hard disk of computer 124. The downloading of music can also be done without using the GUI of the present invention. After the tracks are on disk cartridge 120, disk cartridge 120 is removed from docking station 122 and inserted into music server 102. In one embodiment, music server 102 and head unit 104 are mounted in an automobile. More specifically, music server 102 may be mounted in the trunk of a car and head unit 104 is mounted in the dash board. After disk cartridge 120 is inserted into music server 102, a user can use head unit 104 to access tracks on disk cartridge 120 and play those tracks through speakers 106, 108, 110 and 112.

FIG. 2 is a side view of docking station 122. On the top of docking station 122 is an opening 140 for receiving disk cartridge 120. In one embodiment, disk cartridge 120 is inserted into opening 140 in a vertical orientation. FIG. 2 also shows two wires connected to docking station 122. Wire 142 supplies DC power to docking station 122. In one embodiment, wire 142 is connected to a five volt regulated transformer. Wire 144 connects docking station 122 to a USB port of computer 124.

Figure 3:
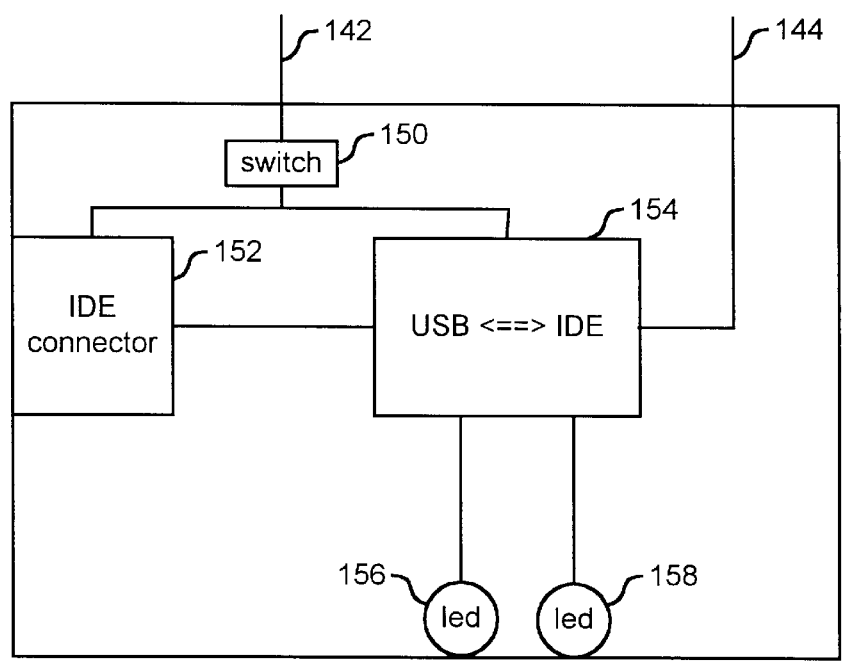
FIG. 3 is a schematic diagram of the dock of the present invention.

FIG. 3 is a schematic of the internal components of docking station 122. Wire 142 is connected to switch 150. Switch 150 is a mechanical switch that is triggered when disk cartridge 120 is completely and properly inserted into opening 140. Switch 150 is connected to IDE controller 152 and USB to IDE interface 154. When switch 150 is triggered (disk cartridge 120 is inserted in docking station 122), power from wire 142 is provided to IDE connector 152 and USB to IDE interface 154. USB to IDE interface 154 is also connected to wire 144, IDE connector 152, LED 156 and LED 158. LED 156 indicates whether docking station 122 is receiving power. LED 158 indicates hard drive activity. In one embodiment, USB to IDE interface 154 is an OnSpec 90C36. The purpose of the docking station is to connect the hard disk drive to the computer. Other alternative docking stations different from that of FIGS. 2 and 3 could also be used within the spirit of the present invention. Examples of suitable alternative docks include a cable that connects to both a computer and the disk drive, a connector that connects to both a computer and the disk drive, a drive bay that is within or connected to the computer and can receive the disk drive, etc.

Figure 4:
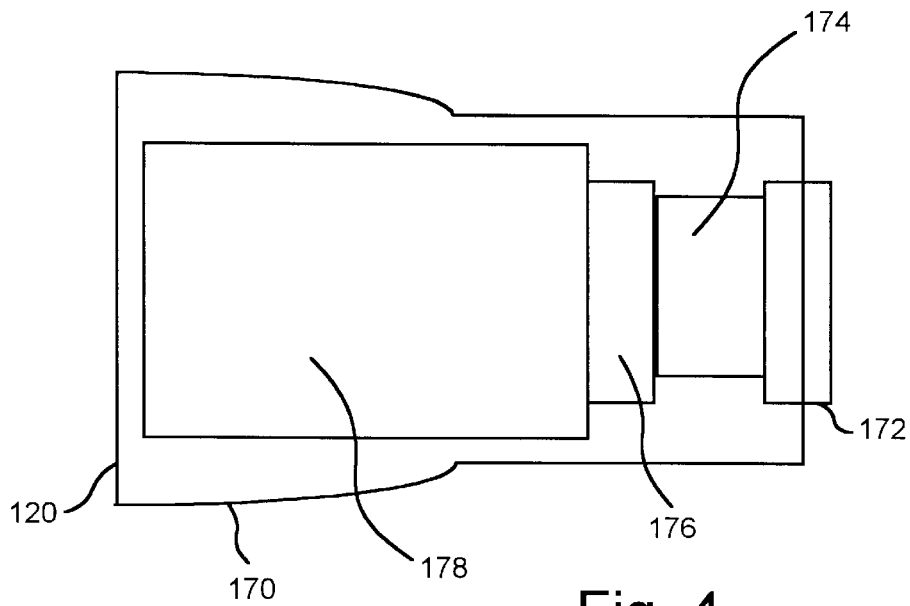
FIG. 4 is a cut away overhead view of a removable hard disk drive.

FIG. 4 shows an overhead cutaway view of disk cartridge 120. Outer shell 170 protects and houses the components of disk cartridge 120. In one embodiment, outer shell 170 is made of hard plastic. Metals can also be used. At one end of outer shell 170 is IDE connector 172. Connected to IDE connector 172 is a printed circuit board (or a flexible ribbon cable) with various circuit elements and wires. For example, flexible ribbon cable 174 includes capacitors and resistors for decoupling. Connected to flexible ribbon cable 174 is connector 176. In one embodiment, connector 176 is a 44 pin connector. Flexible ribbon cable 174 maps signals from connector 172 to connector 176. Connector 176 is attached to hard disk drive 178. In one embodiment, hard disk drive 178 is a 5 gigabyte hard disk drive from Toshiba with a 2½ inch form factor. Other hard disk drives can also be used. A hard disk drives utilizing one or multiple disks can be used. Hard disk drives with multiple disks typically have separate read/write heads for each disk. In other alternatives, the hard disk drive can be replaced by other high density disk drives, flash memory, CDRW or other appropriate storage media. In one embodiment, the gap between hard disk drive 178 and outer shell 170 can be filled with a shock absorbing substance.

Hard disk drive 178 includes music files to be played by music server 102. Hard disk drive 178 also includes various program code and configuration information. In one embodiment, hard disk drive 178 includes at least five top level directories: /MP3, /playlist, /playlist config, /microcontroller config and /OS. The directory /MP3 contains all of the audio files. The directory /playlist contains all the play list files. The drive can store many play lists. Each play list file contains a set of strings. Each string specifies the path location to a particular track in the /MP3 directory. The strings are stored,in the file according to the order set up by the user. The directory /playlist config contains files that include special configuration information for each play list. Examples of such special configuration information includes whether there should be a pause between tracks, whether text output should be enabled, whether random play should be enabled, the length of the gap between tracks, information about repeating tracks in the play list, etc.

The directory /microcontroller config includes a series of files for configuring controller 320 (see FIG. 6) to communicate with head unit 104. One file is a text file with a set of flags which indicate any of the following: disk cartridge change, other devices connected, head unit text on/off, time elapsed to be displayed up or down, etc. The flag indicating disk cartridge change is a one bit binary value that is inverted by computer 124 if disk cartridge 120 is connected to docking station 122 and data is written to or deleted from disk cartridge 120. Note that in one embodiment, music server 102 is prohibited from writing to disk cartridge 120. The directory/microcontroller config also includes a button mapping file which is used to override the function of any button on the head unit. A file is also included which provides a temperature setting for automatically turning the box off. In one embodiment, music server 102 includes a thermometer and electronics for determining the temperature. If the temperature reaches the setting in the file, music server 102 will automatically turn off. Another file in the directory/microcontroller config stores the firmware used to program controller 320 to communicate with head unit 104. The firmware on hard disk drive 178 is encrypted. The/ microcontroller config directory also includes files which store a version number for the encrypted microcode and code for programming a PLD or FPGA (described below).

In the/OS directory, hard disk drive 178 stores the operating system for music server 102. In one embodiment, the operating system used is LINUX. Other operating systems can also be used. In addition to the operating system code, the/OS directory also stores drivers including the IDE driver, audio drivers for the digital to analog converter, a driver for the serial interface between the processor and the controller, etc. The/OS directory also stores a start up file which includes start up code performed by processor 302 after receiving power.

Figure 5:
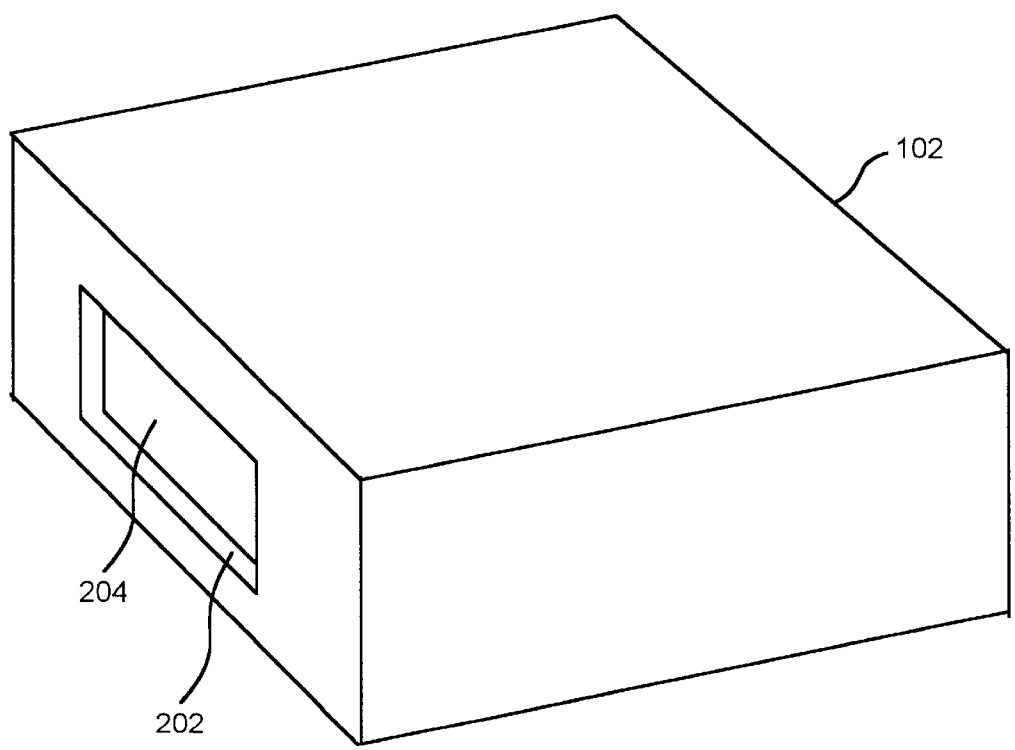
FIG. 5 is the perspective view of the server of the present invention.

FIG. 5 shows a perspective view of music server 102. At one end of music server 102 is an opening 202 for inserting disk cartridge 120. The components of music server 102 are protected by hinged door 204. When disk cartridge 120 is inserted in opening 202, door 204 is opened. In one embodiment, music server 102 will include metal springs or high density shock absorbing air pouches inside the outer box in order to suspend the frame that holds disk cartridge 120.

Figure 6:
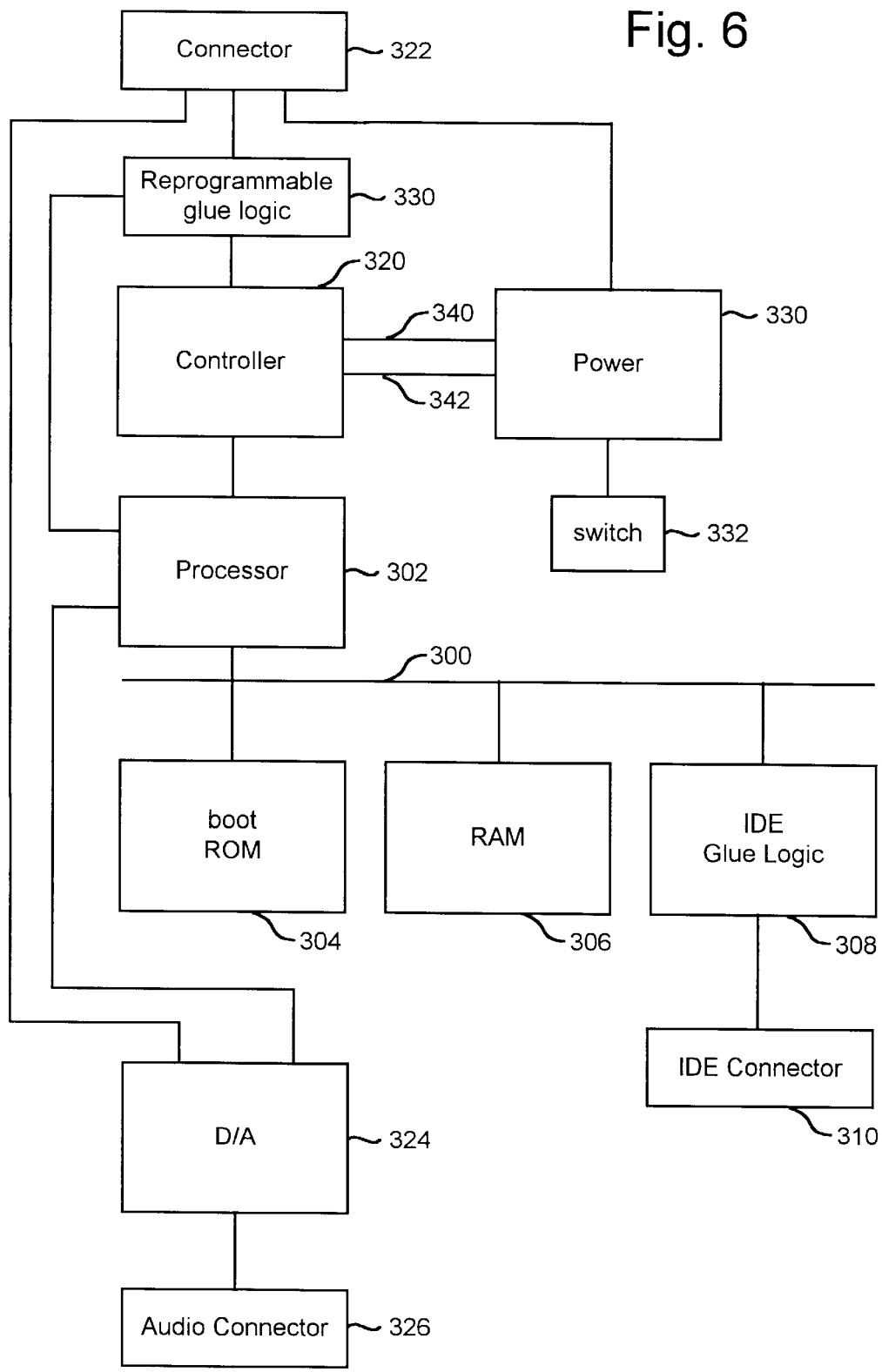
FIG. 6 is a block diagram of the components of the server of one embodiment of the present invention.

FIG. 6 shows a block diagram of the components of music server 102. Bus 300 is connected to processor 302, boot ROM 304, RAM 306 and IDE glue logic 308. Connected to IDE glue logic 308 is IDE connector 310. IDE connector 310 is used to connect to connector 172 of disk cartridge 120. RAM 306 is used as memory for processor 302. In one embodiment, RAM 306 includes 16 megabytes of DRAM. Boot ROM 304 is used to store the code for booting processor 302. Processor 302 is also connected to controller 320. Music server 102 uses a separate processor and controller because the communication with the head unit is in real time, while processor 302 is busy decoding audio and/or visual data. In one embodiment, processor 302 is an EP 7212 from Cirrus Logic, which implements the ARM architecture. One example of a suitable controller is the Phillips 8051 Microcontroller. Note that other processors and/or controllers can also be used. Although controller 320 is referred to as a controller, the terms controller and processor can be used interchangeably and controller 320 can be referred to as a processor. The reason device 320 is referred to as a controller rather than a processor is to make the text clearer to read.

The communication between controller 320 and processor 302 includes a serial interface. In some embodiments, there is also a program signal sent from processor 302 to controller 320. Controller 320 includes an internal flash memory. The program signal is used by processor 302 to program the internal flash memory of controller 320. Controller 320 is connected to glue logic 330, which is connected to connector 322. In one embodiment, connector 322 is a 24 pin centronics port. Connector 322 is attached to a cable. The other end of the cable connects to head unit 104. Many automobile stereo head units have a disc changer port in the back of the head unit. This port contains an interface to connect to a cable. The signals communicated by the disc changer port include a 12 volt power source, ground, an accessory signal, a clock signal and data pins. In some alternatives, the accessory signal is not part of the cable, is not sent or is sent separately.

Glue logic 330 is reprogrammable. For example, glue logic 330 can be an FPGA or a PLD (as well as other suitable reprogrammable logic devices). Glue logic 330 is connected to and programmed by processor 302. Glue logic 330 provides latches, inverters and other glue logic that is specific for each head unit and used to make communication from controller 320 compatible with the particular head unit.

Connector 322 is also connected to power module 330. The cable from head unit 104 to connector 322 provides the auto's accessory signal and a 12 volt power source from the car battery or other power source. This 12 volt power is communicated to power module 330. Power module 330 then creates a 5 volt DC power source, which is communicated to the components shown in FIG. 6. Signal 340 provides 5 volt power to controller 320 The 5 volt power connection to the other components is not shown in FIG. 6. Power module 330 also communicates a 12 volt power signal 342 to controller 320 for programming the internal flash memory of controller 320. In one embodiment, power module 330 is an LM317 from National Semiconductor. Connected to power module 330 is a switch 332. In one embodiment, switch 332 is turned on when disk cartridge 120 is properly inserted into music server 102. When switch 332 is turned on and the accessory signal is on, power module 330 sends the 5 volt power to the components of FIG. 6. When switch 332 is not turned on or the accessory signal is not turned on, power module 330 does not send the power to the components of FIG. 6. Thus, music server 102 will not operate unless disk cartridge 120 is properly inserted in music server 102. In one embodiment, one exception is that the 5 volt power signal 340 is always on. In other embodiments, the system does not include switch 332 and will operate without the insertion of disk cartridge 120. In this alternative embodiment, music can be stored in RAM 306 or another storage medium.

FIG. 6 also shows digital to analog converter 324 connected to processor 302 and connector 322. Also connected to digital to analog converter 324 is audio connector 326. In one embodiment, audio connector 326 includes one or more RCA audio ports. One or more cables connect audio connector 326 to head unit 104. In one embodiment, processor 302 is used to decode the audio/visual files. The decoded audio/visual data is communicated to digital to analog converter 324, and then on to either audio connector 326 or connector 322. Thus, server 120 can provide audio to head unit 104 via connector 322 or audio connector 326, depending on the particular head unit. The audio signal sent via connector 322 can be analog or digital, depending on the particular head unit.

The flash memory internal to controller 320 stores firmware to program controller 320 to interface with the appropriate head unit. If music server 102 is initially set up to communicate with a first head unit and the user subsequently installs music sever 102 into a different automobile with a different head unit, controller 320 can be reprogrammed to communicate with the new head unit by changing the firmware in the internal flash memory of controller 320.

Note that the connection from music server 102 to head unit 104 is described above to include a pin connector and a cable. Alternatives to a pin connector and cable combination include a cable alone, pin connector alone, wireless connection, optical connection, Ethernet, LAN, modem or another high speed or low speed data line.

Figure 7:
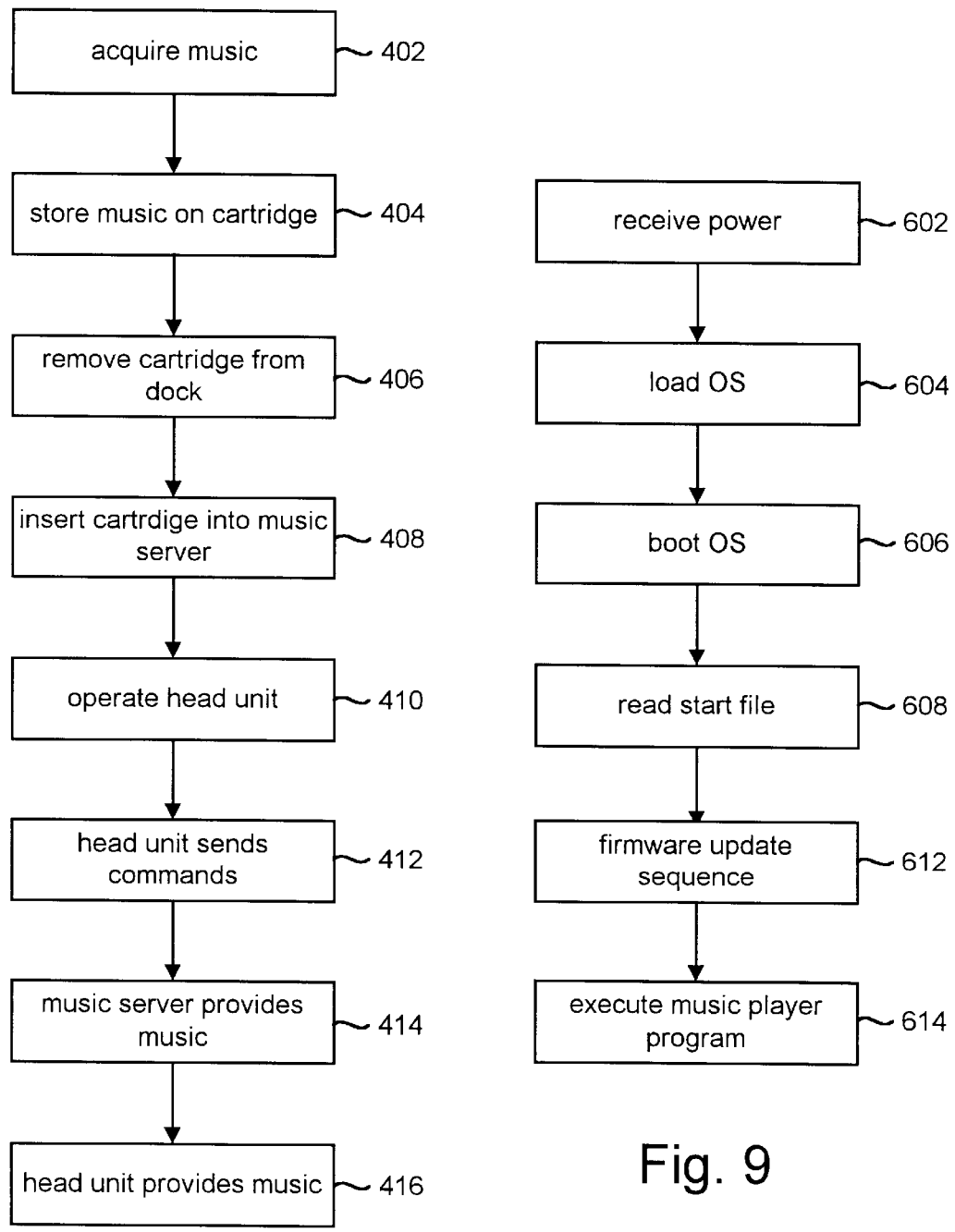
FIG. 7 is a flow chart describing the operation of the present invention.

FIG. 7 is a flow chart describing the overall use of the embodiment of the present invention described above. In step 402, a user acquires music. There are many suitable alternatives for acquiring music. In one embodiment, music is acquired by transferring it from a floppy disk, CD-ROM, audio compact disc, etc. to computer 124. Alternatively, music could be downloaded over Internet 128 from, for example, Internet server 130. Music can also be stored on computer 124 by transferring it across the network, or any other means known for transferring music or other audio/visual files. In step 404, the music desired to be played using music server 102 is transferred from computer 124 to disk cartridge 120 via docking station 122. In step 406, disk cartridge 120 is removed from docking station 122. In step 408, disk cartridge 120 is inserted into music server 102. In step 410, head unit 104 is operated by a user. In step 412, head unit 104 sends commands to music server 102 requesting certain music to be played. In step 414, music server 102 provides the requested music to head unit 104. In step 416, head unit 104 provides the music through speakers 106, 108, 110 and 112.

Figure 8:
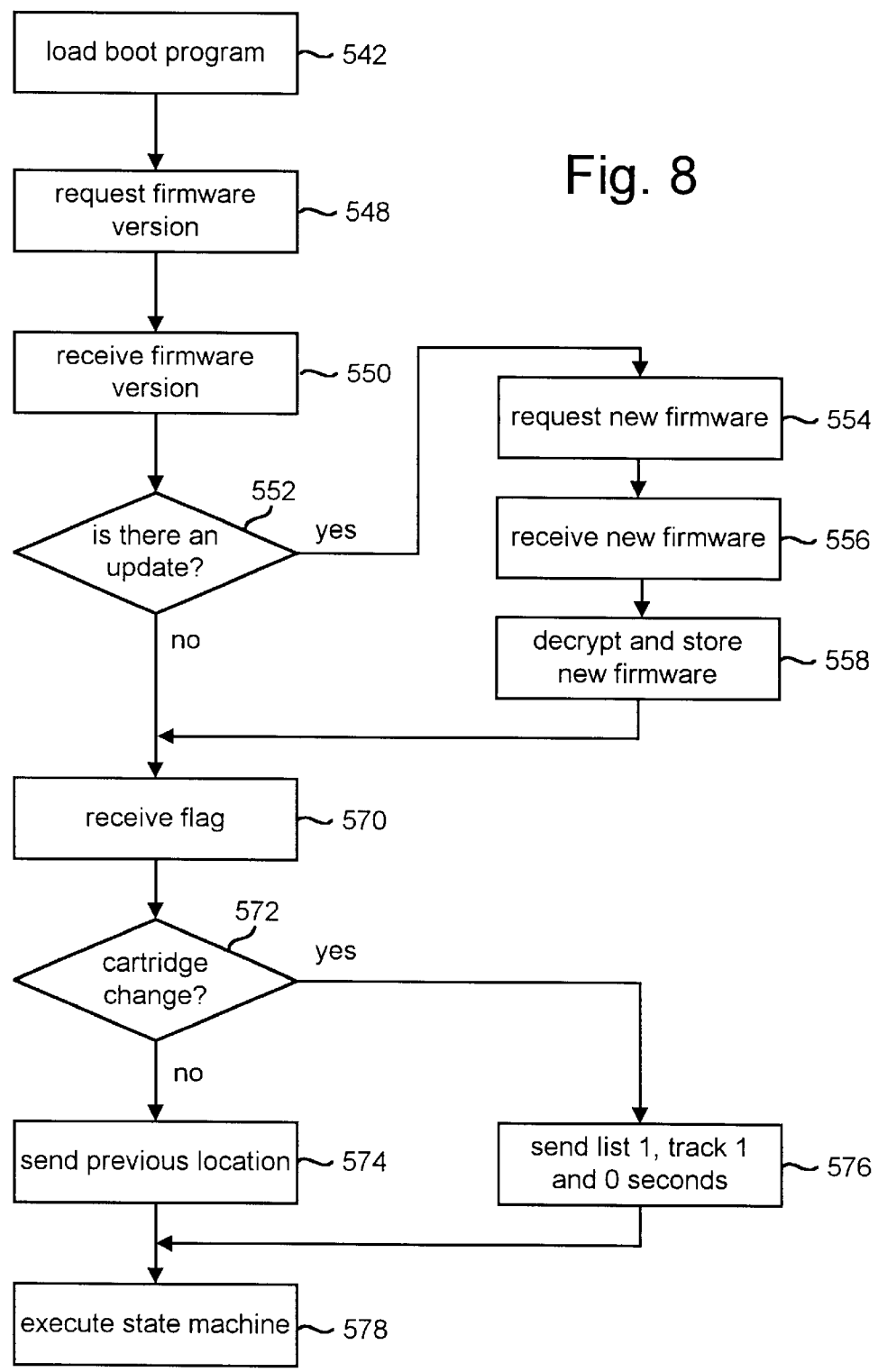
FIG. 8 is a flow chart describing the start up process for the controller.

FIG. 8 provides a flow chart describing the start up process for controller 320 after disk cartridge 120 is inserted in music server 102. In step 542, controller 320 loads its boot program from the internal flash memory. As discussed above, a portion of the internal flash memory of controller 520 is used to store the firmware (interface program code) for programming controller 320 to communicate with head unit 104. In step 548, controller 320 requests that processor 302 access hard disk drive 178 and read the firmware version number stored in the/microcontroller config directory. In step 550, controller 320 receives the firmware version number from processor 302.

In step 552, controller 320 determines whether hard disk drive 178 includes an update to the firmware. In one embodiment, this test is performed by determining whether the firmware version number received in step 550 is higher than the firmware version number for the firmware currently stored in the flash memory of controller 320. If the answer to the test of 552 is no, then the method loops to step 570. In step 570, controller receives and stores the flag indicating disk cartridge change which is stored on hard disk drive 178. In step 572, controller compares the received value of the flag to the previously stored value. If the two flag values match, controller assumes that disk cartridge 120 has not changed (in regard to the tracks) and the method loops to step 574. If the two flag values do not match, then controller assumes that disk cartridge 120 has changed (in regard to the tracks) and the method loops to step 576.

Instep 574, controller sends the previous location to processor 302. During operation of music server 102, controller 320 stores the current location of the server in its internal flash memory. The location includes the current play list being used, the current track being played, and the time elapsed from the beginning of the track (determined using a clock internal to the controller). When music server 102 is turned off, this location information is stored in controller 320 (which remains powered). In step 574, this location information is sent from controller 320 to processor 302. After sending the previous location, controller 320 executes the state machine in step 578. The state machine is a process used to communicate with head unit 104. If step 572 determined that the disk cartridge was changed, then in step 576, controller 320 sends to processor 302 a communication indicating to start playing at the beginning of track 1 of play list 1.

If in step 552 controller 320 determines that there is a firmware update on hard disk drive 178, then the method loops to step 554. In step 554, controller 320 sends a request to processor 302 to load new firmware. In step 556, the new firmware is received by controller 320. In step 558, the received firmware is decrypted and stored in the internal flash memory.

FIG. 9 is a flow chart which describes the start up process for processor 302. In step 602, processor 302 receives power from power module 330 when the power and the accessory signal are provided by head unit 104 and switch 332 is engaged. In step 604, processor 302 loads the operating system from hard disk drive 178. In step 606, processor 302 boots the operating system. In step 608, processor 302 reads the start file from hard disk drive 178 and performs the code therein. In step 612, processor 302 performs the firmware update sequence and, in step 614, processor 302 executes the music player program. More details regarding steps 612 and 614 will be discussed below.

Figure 10:
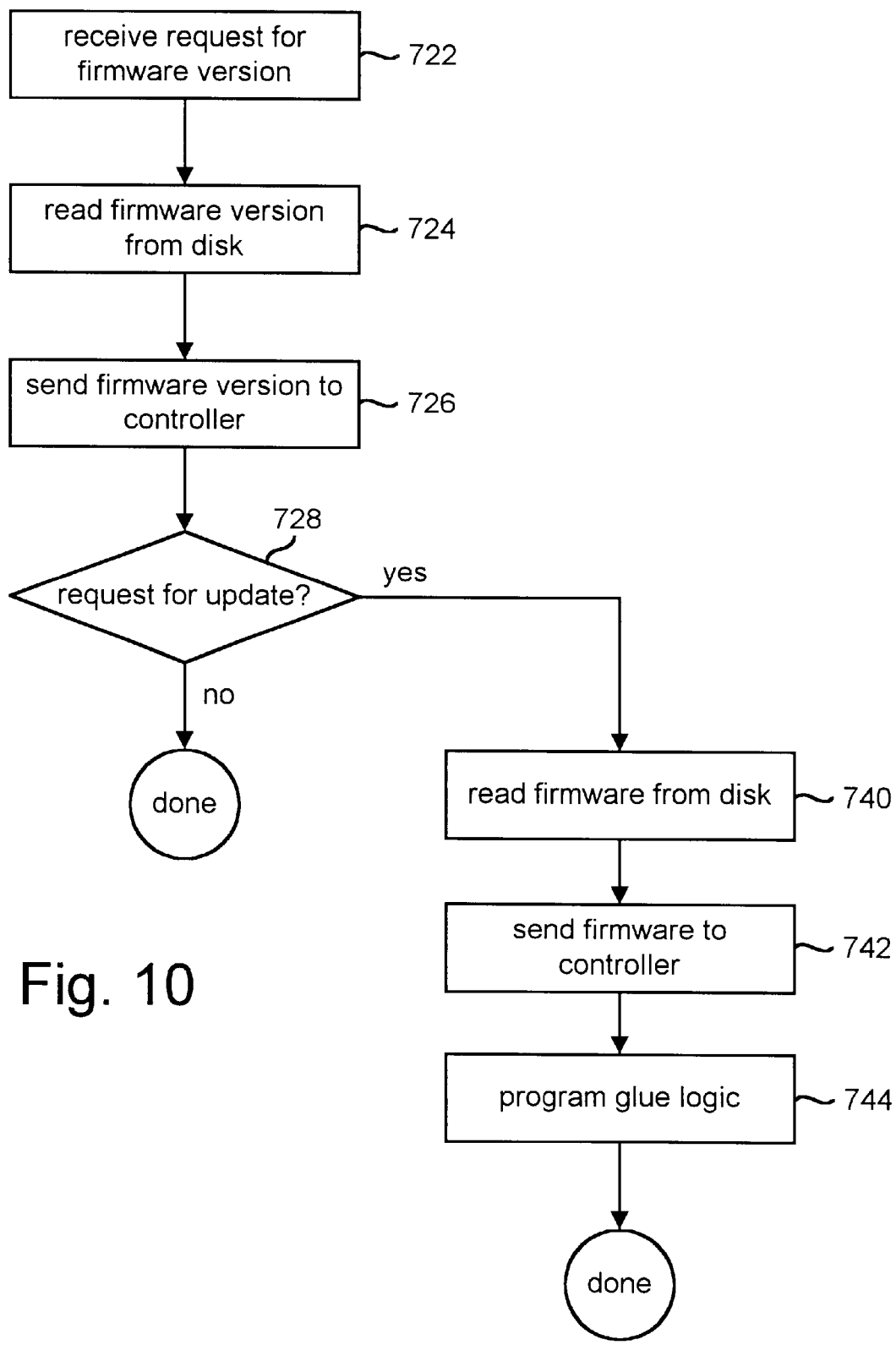
FIG. 10 is a flow chart describing the firmware update sequence performed by the processor.

FIG. 10 depicts a flow chart providing more details of the firmware update sequence performed by processor 302. In step 722, processor 302 receives a request for the firmware version number from controller 320. In step 724, processor 302 reads the firmware version number from the/microcontroller config directory of hard disk drive 178. In step 726, processor 302 sends the firmware version number to controller 320. After sending the firmware version number to controller 320, processor 302 determines whether controller 320 requested a firmware update. If no firmware update is requested, the process of FIG. 10 is done. If a firmware update is requested, the method of FIG. 10 loops to step 740. In step 740, processor 302 accesses and reads new firmware from the/microcontroller config directory of hard disk drive 178. Step 740 also includes accessing and reading new code to program glue logic 330. In step 742, the firmware is sent to controller 320. In step 744, processor 302 programs glue logic 330 according to the code read in step 740. The code used in step 744 may vary by head unit and/or firmware version.

Figure 11:
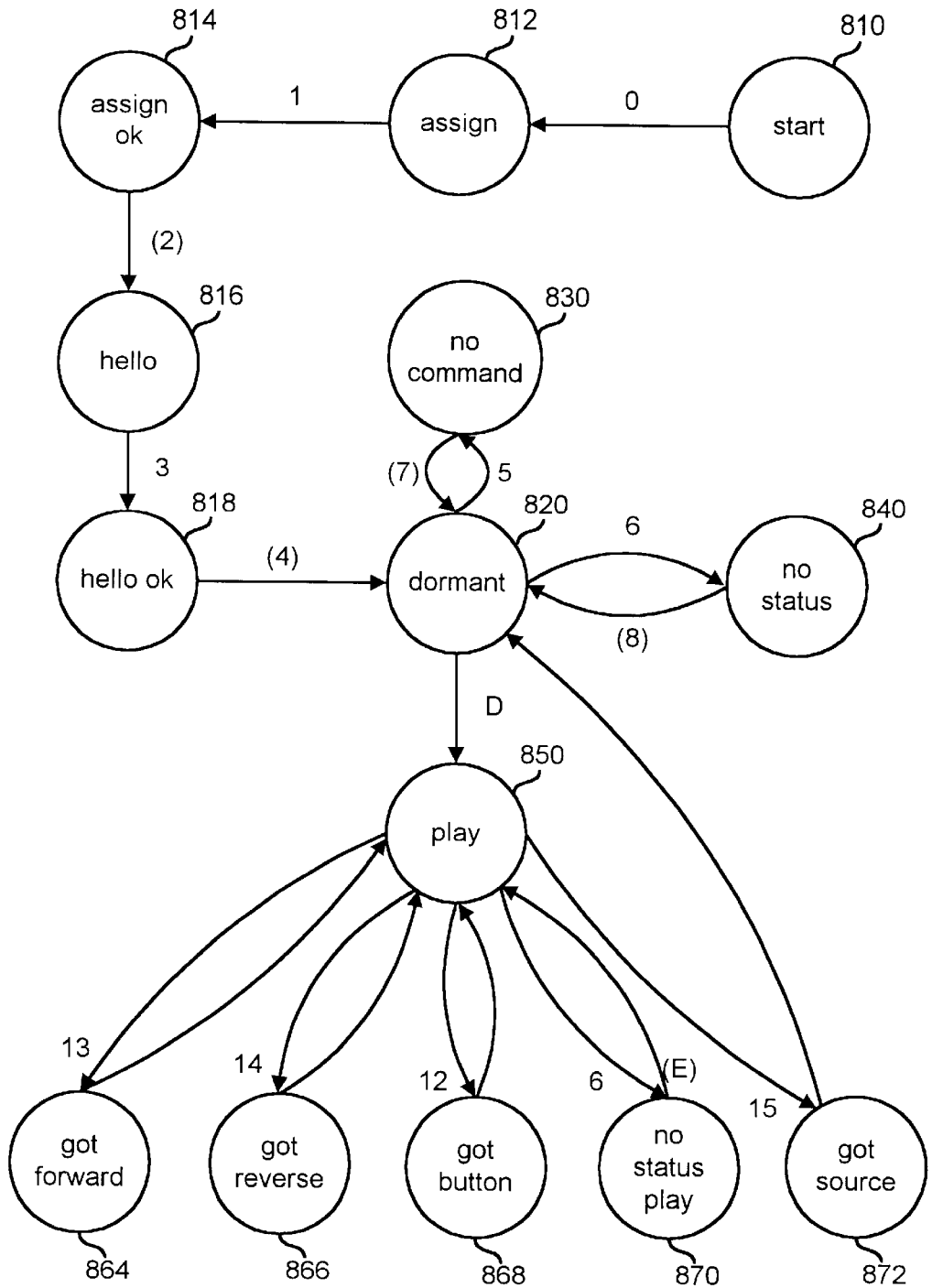
FIG. 11 is a state diagram for the controller.

FIG. 11 is a state diagram describing the communication between controller 320 and head unit 104. Between each pair of adjacent states is an arrow. Next to some of the arrows is a number without parenthesis or a number with parenthesis. A number without parenthesis indicates that controller 320 receives a packet identified by the number. A number next to the arrow in parenthesis indicates that controller 320 communicates to head unit 104 a packet identified by the number in parenthesis. Table 1 below describes the various packets. The packets of Table 1 and the state diagram of FIG. 11 are specific to one or more head units manufactured by Sony Corporation, for example, the Sony Model XR-C5120.

TABLE 1

| 0 | 1 | 2 | 3 | 4 |
|---|---|---|---|---|
| e7 | e7 | ef | ce | ef |
| ef | ef | cf | ef | ce |
| fe | fe | 73 | fd | 73 |
| ff | fd | 5f | f7 | 5f |
| d6 | d4 | 93 | b4 | 92 |
| ff | ff | fa | ff | fb |
|  |  | 57 |  | 57 |
|  |  | da |  | da |
|  |  | 5f |  | 5f |
|  |  | 21 |  | 21 |
|  |  | ff |  | ff |

TABLE 1-continued

| read | read | write | read | write |
|---|---|---|---|---|
| 5 | 6 | 7 | 8 |  |
| ce | ce | cf | ef |  |
| ef | ef | ce | ce |  |
| fe | fe | 8f | ff |  |
| ec | ed | 5f | 7f |  |
| aa | ab | 8e | 3e |  |
| ff | ff | ff | ff |  |
| read | read | write | write |  |

| D | E |
|---|---|
| ce | 8f |
| ef | ce |
| df | 3f |
| ff | bf |
| 9e | 5e |
| ff | ff |
|  | ff |
|  | ff |
|  | ff |
|  | ff |
|  | 0e |
|  | 0f |
|  | ff |
| read | write |

| 12 | 13 |
|---|---|
| ef | ef |
| de | de |
| c3 | c1 |
|  | 6f |
|  | 0 |
|  | ff |
| read | read |

| 14 | 15 | 16 |
|---|---|---|
| ef | ef | ef |
| de | de | de |
| c1 | df | df |
| 7f | 7f | af |
| 10 | 2e | 5e |
| ff | ff | ff |
| read | read | read |

Initially, controller 320 begins in "start" state 810. Upon receiving packet 0, controller 320 enters "assign" state 812. Upon receiving packet 1, controller 320 enters the "assign ok" state 814. States 812 and 814 include head unit 104 verifying the assignment of an address to music server 102. Head unit 104 was initially designed to communicate with a disc changer. Thus, the packets sent from head unit 104 are meant for a disc changer. Controller 320 performs the state machine of FIG. 11 in order to emulate a disc changer. In state 814, music server 102 sends an acknowledgment back to head unit 104 by sending packet 2 and entering "hello" state 816. While in "hello" state 816, head unit 104 sends packet 3 to controller 320. After receiving packet 3, controller 320 enters the "hello ok" state 818 and sends packet 4 to head unit 104. After sending packet 4, controller 320 enters "dormant" state 820. States 810–818 are start-up states.

State 820 begins normal operation. While in "dormant state" 820, controller 320 expects to receive either of packets 5, 6 or D. If packet 5 is received from head unit 104, controller 320 enters "no command" state 830, responds back to head unit 104 with packet 7 and resumes "dormant" state 820. If packet 6 is received, controller 320 enters "no status" state 840, responds back to head unit 104 with packet 8 and returns to "dormant" state 820. While in "dormant" state 820, if head unit 104 sends packet D, controller 320 enters "play" state 840. Upon entering "play" state 840, controller 320 will issue a request to processor 302 to begin playing music. In one embodiment, processor 302 plays music according to a selected play list.

Controller 320 will remain in "play" state 850 until it receives either of packets 6, 12, 13, 14 or 15. If in "play" state 850 controller 320 receives packet 13, then controller 320 will enter the "got forward" state 864. In "got forward" state 864, controller 320 will communicate to processor 302 to play the next track on the play list and then controller 320 will return to "play" state 850. While in "play" state 850, if controller 320 receives packet 14 controller 320 will transition to "got reverse" state 866 and send a communication to processor 302 to play the previous track (or go to the previous beginning of a track). After communicating with processor 302, controller 320 will return back to "play" state 850. While in "play" state 850, if controller 320 receives packet 12, controller 320 will enter "got button" state 868. Packet 12 will indicate a particular button (typically 1–10) which was selected by the user on head unit 104. In "got button" state 868, controller 320 will communicate to processor 302 that a button was pushed and provide the identification of the button (e.g. 1–10). In one embodiment, head unit 104 has ten numbered buttons and each button corresponds to a play list. Thus, if button 2 was pushed, music server 102 will begin playing tracks from the second play list. After communicating with processor 302 in "got button" state 868, controller 320 will resume "play" state 850. While in "play" state 850, if controller 320 receives packet 6, controller 320 will enter the "no status play" state 870. While in "no status play" state 870, controller 320 will send packet E, the play list number, track number and (optionally) the title of the track to head unit 104 so that head unit 104 can update its display. Controller 320 acquires the information from processor 302. After communicating with head unit 104 in regard to the display, controller 320 resumes "play" state 850. While in "play" state 850, if controller 320 receives packet 15, controller 320 enters "got source" state 872. Packet 15 indicates that another source of music has been chosen for playing through head unit 104. For example, the user may have selected a cassette or radio instead of music server 102. Controller 320 proceeds from "got source" state 872 back to "dormant" state 820, instructs processor 302 to stop playing music and stores the current play list and track number.

The firmware stored on the internal flash memory of controller 320 programs controller 320 to perform the state machine of FIG. 11. The communication between controller 320 and various head units can be figured out by reverse engineering the communication from the head unit. In other embodiments, the audio/visual server of the present invention is used for purposes other than storing music, communicating with an automobile audio head unit and emulating a disc changer. For example, the server can store videos, text data, etc. For each application, the state diagram of FIG. 11 may need to be changed to communicate with the appropriate head unit. The inventors contemplate that the term "head unit" is used to refer to the device that communicates with the server and that interfaces with a user to provide the audio/visual data. As can be seen from FIGS. 6 and 11, music server 102 receives commands from head unit 104 and sends either music information, commands or other data to head unit 104. Thus, music server 102 is in bidirectional communication with head unit 104.

Figure 12:
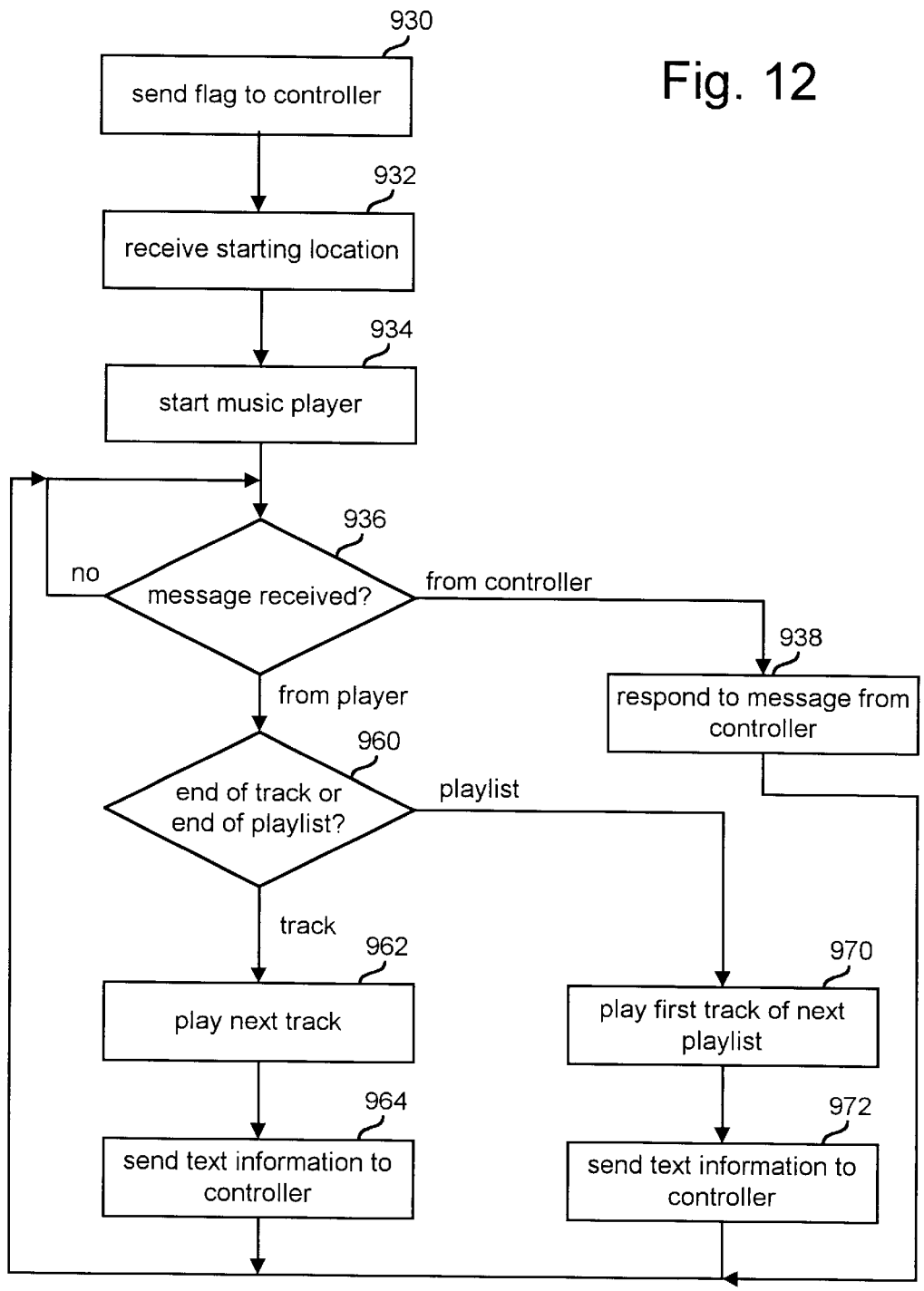
FIG. 12 is a flow chart describing a process performed by the processor for playing audio/visual data.

FIG. 12 is a flow chart describing the music player program performed by processor 302. This is the normal operation during which music server 102 provides music information to head unit 104. In step 930, processor 302 reads the flag indicating disk cartridge change from the directory/microcontroller config of disk drive drive 178 and sends the value read to controller 320. In step 932, processor 302 receives a starting location from controller 302. Step 932 is performed in response to either step 574 or step 576. In step 934, processor 302 starts the music player according to the location received in the previous step. The music player is software for playing the particular music under consideration. For example, if the music is stored in MP3 format, the music player is a MP3 music player that can read, decode and play MP3 files. The present invention supports many different formats other than MP3. Examples of suitable formats include CD format, WMA, AudioSoft, Mjuice, MOD, WAV, atrac, liquid audio, twinuq, real audio and other formats known in the art.

In step 936, processor 302 determines whether a message has been received. If no message was received, the music player continues playing the music file. If a message was received, processor 302 determines whether the message was from the controller 320 or from the music player. If the message was from controller 320, the method loops to step 938 and responds to the message from controller 320. Messages from controller 320 include play next track, play previous track, play next play list, play previous play list, play a particular track, stop playing, etc. After responding to the message from controller 320 in step 938, the method loops back to step 936. If the message in step 936 was received from the music player, then in step 960 processor 302 determines whether it was an "end of track" or "end of play list" message. If the message was "end of track," then in step 962 processor 302 causes the music player to play the next track. Playing a track includes reading a file from disk cartridge 120, possibly decoding data and sending audio information to head unit 104. In step 964, processor 302 sends the text information about the music track currently being played to controller 320. After step 964, the method loops back to step 936. If in step 960 it is determined that the message from the music player was "end of play list," then in step 970 processor 302 causes the music player to play the first track for the next play list. In step 972, processor 302 sends the text information for the new track to be played to controller 320. After step 972, the method loops back to step 936.

While the system described above can be used to emulate a compact disc changer, music server 102 stores music in a format that is not compatible with compact disc players. For example, compact disc players cannot read files stored in MP3 format.

Figure 13:
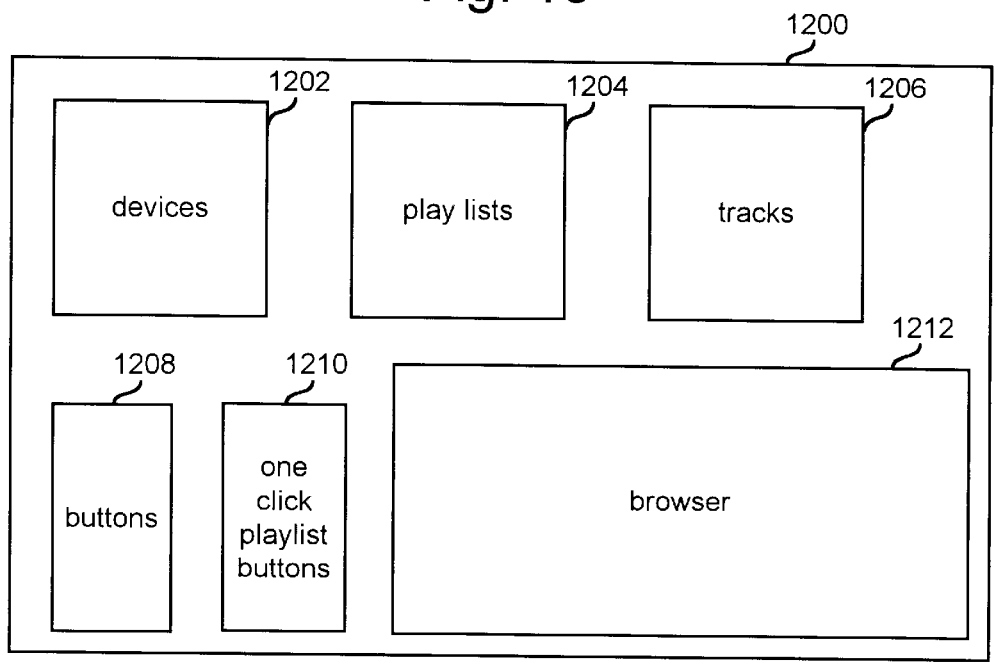
FIG. 13 depicts the graphical user interface for the software used on a computer to manage play lists and load tracks on the hard disk drive.

FIG. 13 depicts a GUI for the software operating on computer 124. This software allows the user to create play lists, add or remove tracks from a play list, add or remove tracks from disk cartridge 120, and configure music server 102. A play list is a list of tracks to be played. GUI 1200 has a subwindow 1202 which lists all the devices that can be communicated with to store tracks. Subwindow 1204 identifies the play lists that have been created. Subwindow 1206 identifies the tracks in the track list. The track list is a list of the tracks that have been made known to the software providing GUI 1200. In one embodiment, tracks are added to the track list by moving tracks into a directory or dragging tracks into window 1206. The track list can be all the tracks in the directory, on a storage medium, in a computer, etc. Alternatively, the track list could be all the tracks placed in the track list by the user. GUI 1200 also has a set of buttons 1208. These buttons perform actions. Examples of appropriate buttons include "add a track to track list," "add a track to a play list," "create play list," "edit play list," "edit track information," "new device," "edit device," "synchronize with device," "delete play list," "search for tracks," etc.

GUI 1200 also includes a set of one or more "one click" play list buttons. A "one click" play list button is a means for a user to perform only one action—select the one click play list button—to create a play list. In one embodiment, there is a set of "one click" play list buttons organized by genre. Thus, there will be one button to create a jazz play list, one button to create a rock play list, one button to create a blues play list, etc. There could also be a set of "one click" play list buttons organized by year the track was recorded, artist, or other suitable criteria. In one embodiment, a user can select more than one "one click" play list and then instruct the computer to generate all of the selected "one click" play lists. The "one click" play lists can be updated automatically or can be updated in response to a user selecting a button on GUI 1200.

GUI 1200 also shows a browser 1212. This browser can be used to search the Internet, a network, a hard drive, etc., to find and acquire tracks. Once a track is found using browser 1212, it can be dragged to track list 1200 and/or any of the play lists in window 1204. In one embodiment, browser 1212 is used to search for tracks on Internet server 130.

Figure 14:
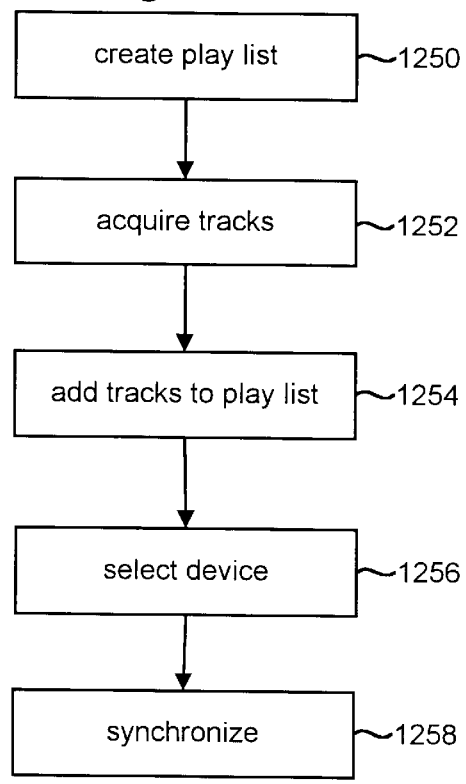
FIG. 14 is a flow chart describing the process of acquiring tracks, managing tracks and adding tracks to a device.

FIG. 14 is a flow chart which describes a method for using GUI 1200. In step 1250, a user creates a play list. In step 1252, the user acquires tracks. In step 1254, a set of one or more tracks are added to the play list. In step 1256, the user selects a device for transferring the tracks. In step 1258, the user synchronizes data with the device selected in step 1256. Step 1258 includes storing on the selected device the play list and the tracks identified in the play list.

Figure 15:
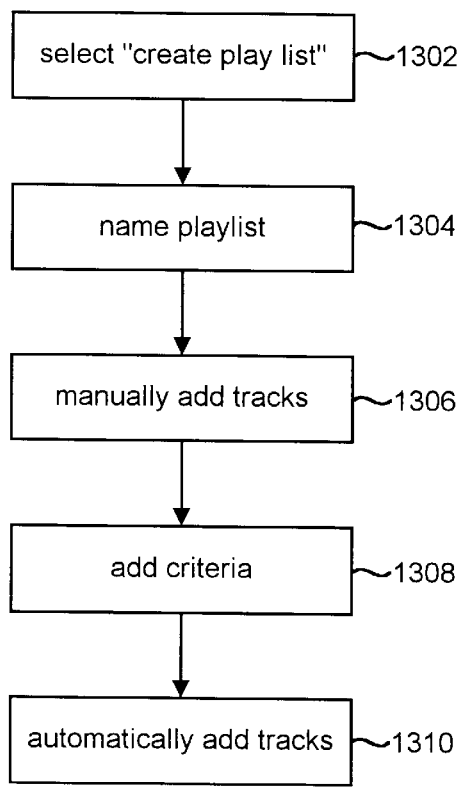
FIG. 15 is a flow chart describing the process of creating a play list.

FIG. 15 is a flow chart describing the process of creating a new play list. In step 1302, the user selects the "create play list" button from window 1208. Alternatively, the user can right click on window 1204 and select "new." In step 1304, the user provides a name for the new play list. In step 306, the user can manually add tracks to the play list. One means for manually adding tracks includes dragging tracks from tracks window 1206 to play list in window 1204. The user can also drag tracks using a browser. Additionally, the user can select the "add track" button from window 1208 and identify the tracks to be added from any accessible storage medium.

In step 1308, the user adds criteria to the play list for automatically adding tracks. Criteria is defined as a rule or test for which a decision can be made. Criteria can be a set of on of one or more boolean expressions, one or more tests, one or more data values which must be matched, etc. Example of information that can be included in play list criteria includes artist name, title, album name, year of recording, genre, tempo, source, file bit rate, similarity information, etc. The criteria can be added by inserting data into fields of a template, by writing boolean expressions, by selecting or entering data or boolean expressions using menus, or other suitable means. Criteria for a play list may include multiple terms. For example, the criteria for a play list can specify a genre and a time frame. In one example of steps 1302–1308, a user may create a new play list called "early Beatles." The criteria entered in step 1308 would include the artist name being equal to "Beatles" and date field being equal to "prior to 1965." Additional criteria could also be used.

In one embodiment, software can be provided for automatically determining the tempo of a track. Similarity information is information that is stored that describes one track in terms of another track. For example, in one embodiment, Internet server 130 will include a similarity database. This database will indicate that a particular track is similar to other tracks. Alternatively, the database can indicate that when users have downloaded a particular track, users also typically download another specified track. In one alternative, instead of storing the similarity information on Internet server 130, it could be stored on computer 124.

In step 1310 of FIG. 13, the system automatically adds tracks to the newly created play list according to the criteria specified in step 1308. The term "automatically" is used to mean that no human action is required to add the track. In one embodiment, step 1310 is performed by the software searching through the tracks listed in window 1206. In another embodiment, the system searches through all the tracks on the hard disk drive of computer 124, on the entire network connected to computer 124 or on another specified storage medium. For each track found during a search, the properties for the track are compared to the criteria for the play list. If the properties for the track satisfy the criteria for the play list, the software adds the track to the play list. Properties for a track satisfy criteria for a play list if all of the tests of the criteria for the play list are successful in light of the properties for the track. For example, for the "early Beatles" play list mentioned above, a song by the Beatles recorded in 1963 has properties that satisfy the play list criteria regardless of the album title, genre, etc.

Figures 16, 20:
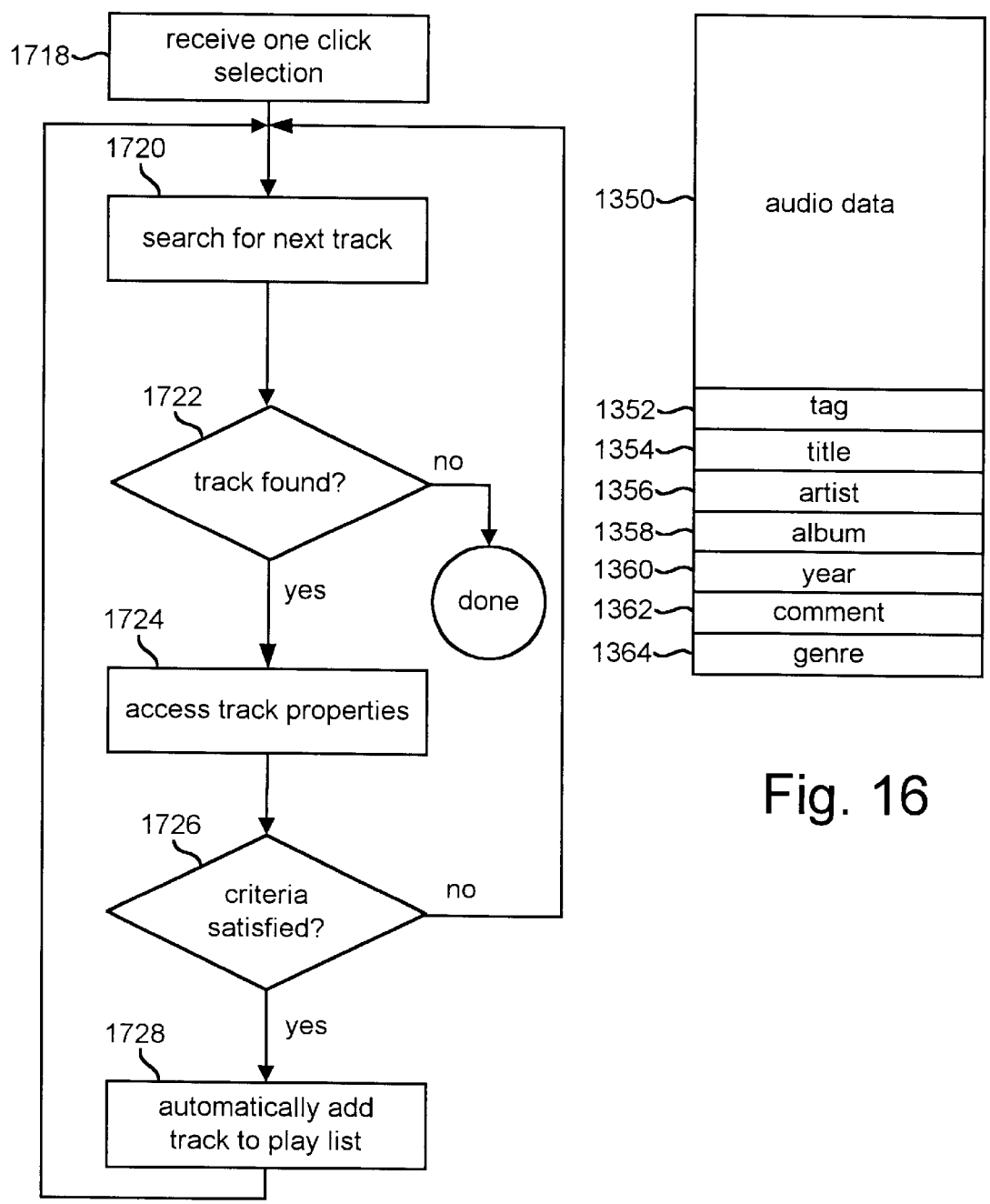
FIG. 16 is a block diagram depicting an ID3 tag.
FIG. 20 is a flow chart describing the process for generating a one click play list.

When storing tracks in MP3 format, the end of the file includes an ID3 tag. In an embodiment of the present invention that uses files stored in MP3 format, the track's properties are stored in the ID3 tag. FIG. 16 depicts an exemplar ID3 tag attached to audio data 1350. The first field is tag field 1352, which is a 3 byte field storing the characters "TAG." The second field is title field 1354, which is a 30 character field indicating the title of the track. The third field is artist field 1356, which is a 30 character field indicating the name of the artist. The fourth field is album field 1358, which indicates the title of the album and is 30 characters. The fifth field is year field 1360, which indicates the year the track was recorded and is 4 characters. The sixth field is comment field 1362, which is a 30 character field for storing comments. In one embodiment of the ID3 tag, the next to last byte of comment field 1362 is set to zero and the last byte of comment field 1362 indicates the track number on the CD that the music comes from. The final field is the genre field 1364, which is a 1 byte field indicating the genre.

The properties stored in the ID3 tag are compared against criteria specified for the player list to determine whether the track should be added to the play list. If the information in the ID3 tag satisfies the criteria, the track is added to the play list. For example, if the play list criteria requires the artist to be the Beatles and year of recording to be prior to 1965; and the ID3 tag for the song indicates that the artist is the Beatles and the year of recording is 1963, then the properties in the ID3 tag satisfy the criteria for the play list. Other formats for digital music do not use ID3 tags. The present invention can also be used with other audio/visual file types which use other formats for header information. In addition to using properties stored in header (or footer) information for a file, the properties for tracks can also be stored in a database on computer 124, Internet server 130, or another suitable location. The system could use that database to determine whether a particular track has properties satisfying the criteria of a play list. One example of step 1310 includes looking at every track in track list 1206 and determining whether the infomration stored in the ID3 tags satisfy the criteria added in step 1308.

After one or more play lists are created, the system will automatically update the play lists. That is, as a new track becomes available, it will be automatically added to any play list for which the properties of the track satisfy the criteria for the play list. The automatic adding of a track to a play list could be triggered by adding a track to track list 1206, storing a track on the hard disk of computer 124, accessing a track over a network or the Internet, putting a track in a certain directory or otherwise making a track accessible. The key is that the track or properties for the track is stored somewhere that is accessible in an appropriate manner to trigger the process of automatically adding tracks to the play list. The tracks are added automatically without the user requesting the track be added.

Figure 17:
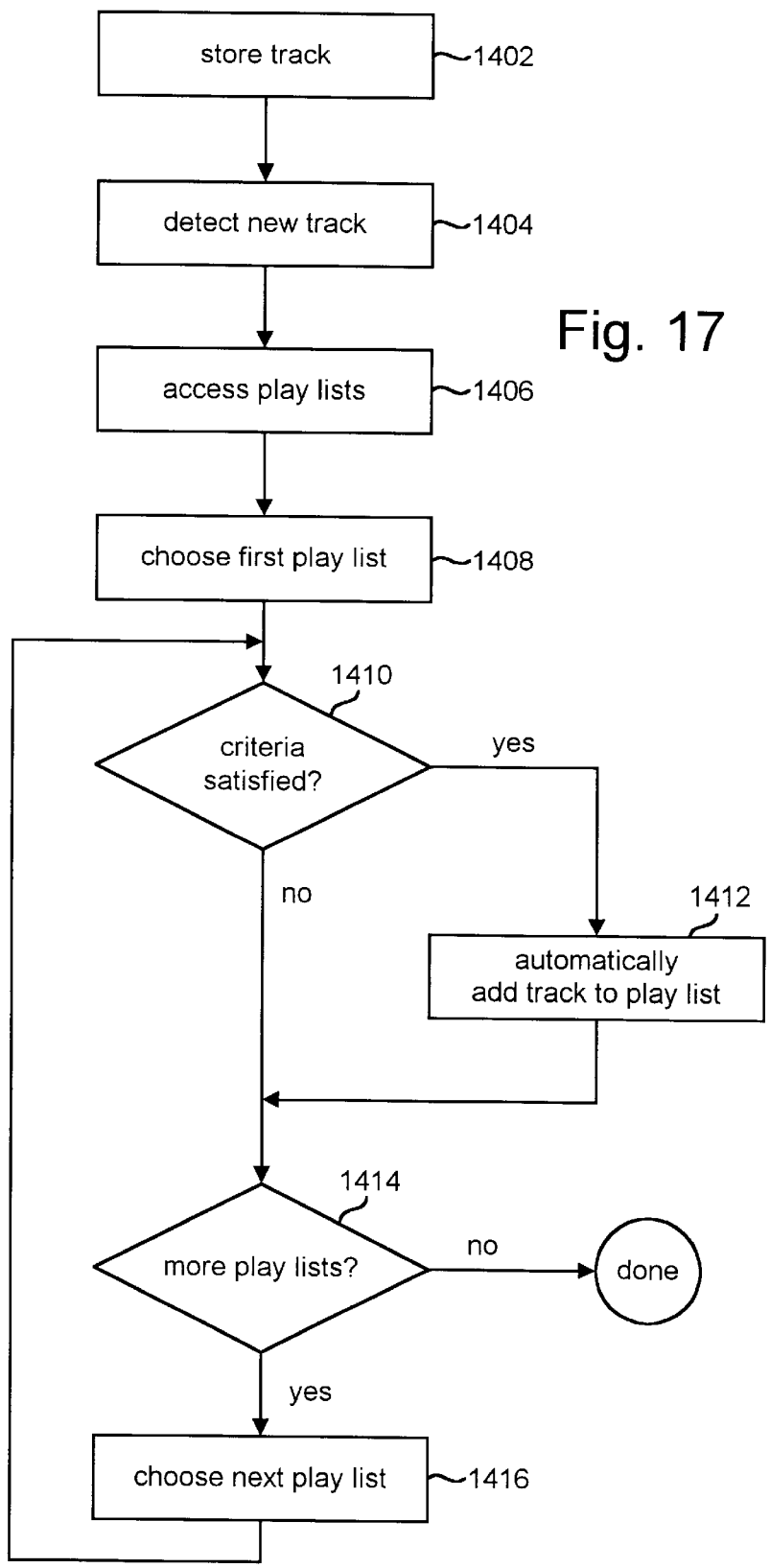
FIG. 17 is a flow chart describing the method for automatically adding tracks to a play list.

FIG. 17 provides a flow chart describing one method for automatically adding a track to one or more play lists. In step 1402, the track is stored. As discussed above, the track can be stored in the track list, hard drive, computer, network, Internet, etc. so that the track is accessible by the software. In step 1404, the system detects that the new track is accessible. In the embodiment where the track is added to track list 1206, the addition to the track list is the detection of the new track. In other embodiments, a background process can be set up to monitor the hard disk, floppy disk, network, Internet, etc. After a new track is detected, the system accesses (step 1406) the play lists listed in window 1204. In step 1408, a first play list is chosen. In step 410, the system compares the properties for the track to the criteria for the play list in order to determine whether the properties for the track satisfy the criteria for the play list. In one example, step 1410 includes determining whether the properties stored in an ID3 tag satisfy the criteria specified for the particular play list. For example, if the criteria for the play list includes a specific artist, step 1410 includes determining whether the artist identified in the ID3 tag is the same artist that is defined in the criteria for the play list. Other means for storing and comparing properties can also be used. Additionally, various embodiments of the present invention use different quantities of properties. For example, the present invention will work with only one property per track. As described above, storing more than one property also works with the present invention.

If, in step 1410, the criteria for the play list is satisfied then the method loops to step 1412 and the track is automatically added to the particular play list under consideration. After step 1412, the method loops to step 1414. If in step 1410, the criteria was not satisfied, then the method loops directly to step 1414. In step 1414, it is determined whether there are any more play lists to consider. If there are no more play lists to consider, then the method of FIG. 17 is completed. If there are more play lists to consider, then the method loops to step 1416 and the next play list is chosen. After step 1416, the method loops back to step 1410 and determines whether the properties for the track satisfy the criteria for the new play list. In one embodiment of step 1412, the software provides a window to the user indicating that the track is to be added. In another embodiment of step 1412, the software provides a window indicating to the user that the track meets the criteria for a play list and requests that the user confirm that the track should be added to the play list.

Figure 18:
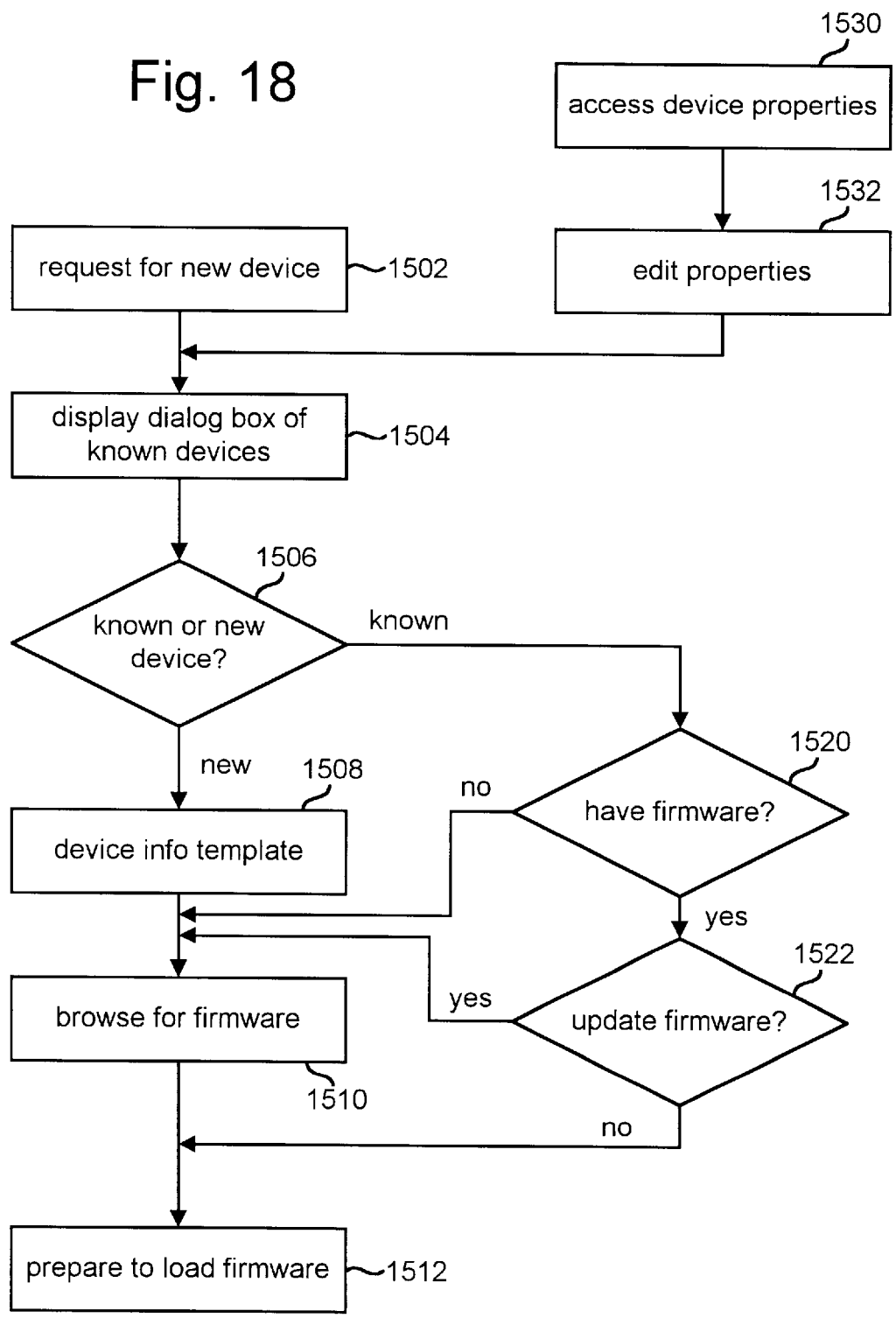
FIG. 18 is a flow chart describing the method of selecting new interface program code to be loaded on the server of the present invention.

FIG. 18 provides a flow chart describing the steps for selecting new firmware to be loaded on music server 102. The steps of FIG. 18 are performed using GUI 1200. In step 1502, a user will request that a new device be created on GUI 1200. In one embodiment, step 1502 is performed by selecting one of the buttons of window 1208. Alternatively, step 1502 can be performed by right clicking (with a mouse or other pointing device) in window 1202 and selecting "new device." In step 1504, a window will be provided by GUI 1200 which lists all devices that are known to the software. The user has the option (in step 1506) of selecting any of the known devices or indicating that the user wants to add a new unknown device. If the user decides to add a new device, a new window is provided to the user in step 1508. The window of step 1508 includes a device information template for the user to provide information about the device. This may include an identification of the port for communicating to the device, the type of memory the device uses, firmware information, operating information, capacity, etc. In step 1510, the user can browse computer 124, a network, Internet 128, Internet server 130, or another medium to find firmware for the new device. In step 1512, the firmware is prepared to be loaded. Step 1512 could include placing the firmware in a specific directory for loading on the device or adding a link to the firmware in a synchronization file for the device.

If in step 1506 the user selected a known device, then in step 1520 the system determines whether the system already has firmware for that device. If the system does not have firmware for that device, then the method loops to step 1510. If the system does have firmware for the device, then in step 1522 the system determines whether the firmware needs to be updated. Step 1522 can be a manual process that includes the user looking at the date of the latest firmware update. Step 1522 can also be an automated process that includes searching for information indicating whether firmware updates exist (e.g. searching Internet server 130). If the firmware needs to be updated, then the method loops to step 1510. If the firmware does not need to be updated, the method loops to step 1512.

The user also has the opportunity to edit device properties for an existing device. In step 1530, the user can access the device properties by selecting a device from window 1202 and selecting the "edit properties" button from window 1208. Alternatively, the user can right click on any of the devices shown on window 1202 and select "properties." The system will provide a window listing all the properties for the particular device. In step 1532, the user can edit the device properties. After step 1532, the method loops to step 1504 and provides the user with the opportunity to change the device or change the firmware.

One example of the use of the method of FIG. 18 is when the user had initially installed music server 102 to work with a first head unit 104. Subsequently, the user connects music server 102 to a new head unit. In order for music server 102 to communicate with the new head unit, new firmware must be loaded for the new head unit. This is performed using the method of FIG. 18. Specifically, the user will perform step 1530 and access device properties for music server 102. In step 1532, the user can change the appropriate properties. In step 1504, the user will be provided with a list of the known devices. In one embodiment, each head unit is specified as a device in step 1504. Thus, the user will choose one of the head units or choose to create a new head unit specification. At the conclusion of the method of FIG. 18, the firmware for the new head unit will be prepared for loading in step 1512.

FIG. 19 is a flow chart describing the process for synchronizing data between computer 124 and the device playing the tracks. In one embodiment, the method of FIG. 19 is used to synchronize data between computer 124 and disk cartridge 120. However, the steps of FIG. 19 can be used for other devices. In embodiments that don't use a disk cartridge 120, the steps of FIG. 19 are used to synchronize between computer 124 and the storage medium for the particular device.

In step 1600 of FIG. 19, the system receives a request to synchronize. Step 1600 may be a result of a user selecting a device and selecting the "synchronize" button in window 1208. In step 1602, the system accesses all the GUI device files that the GUI had prepared for loading onto the device. In step 1604, the system access all the files stored on the actual device to be synchronized. In step 1606, tracks that are on the device storage medium and not identified by the GUI as to be loaded onto the device are removed from the device storage medium. In step 1608, tracks that are identified by the GUI to be loaded on the device but are not actually on the device, are added to the device storage medium. In step 1610, the flag indicating disk cartridge change in the directory/microcontroller config of disk drive 178 is changed. In step 1612, play list files on the device are replaced by the new play list files. In step 1614, the play list configuration files are updated on the storage device. In step 1616, the system determines whether there is any new device configuration information. If there is, the new device configuration information is added to the storage medium for the device in step 1618. After step 1618, or if there was no new device configuration information, the system continues to step 1620. In step 1620, the system determines whether there is new firmware to load. If there is no new firmware, the system skips to step 1628. If there is new firmware, the system will add the new firmware and the firmware version number to the storage medium in step 1624. In step 1628, the system determines whether there is an update to the operating system. If not, the method is done. If there is, then in step 1630 the operating system update is added to the storage medium.

As discussed above, window 1210 includes a set of "one click" play list buttons. FIG. 20 provides a flow chart for responding to a user selection of a "one click" play list button. In step 1718, the system receives a selection of a "one click" button. In step 1720, the system searches for the next track to be considered. Step 1720 could include searching the track list of window 1206, the hard drive of computer 124, another storage medium, a network, the Internet, Internet server 130, etc. In one embodiment, the system can be preconfigured to determine where to search. In step 1722, the system determines whether a track was found. If not, the method of FIG. 20 is done. If a track was found, then the method continues with step 1724. In step 1724, the system accesses the properties for the track found in step 1722. In one embodiment, step 1724 includes accessing the ID3 tag. In step 1726, the system determines whether the properties for the track satisfy the criteria for the "one click" play list. If the properties for the track satisfy the criteria for the play list, the track is automatically added to the play list in step 1728 and the method loops to step 1720 to search for another track not already considered by the method of FIG. 20. If the criteria for the track does not satisfy the criteria for the play list (step 1726), then the method loops to step 1720. At the end of the method of FIG. 20, a play list is set up which has a set of tracks having properties that satisfy the criteria for that play list. Note that the steps of FIG. 20 are performed in response to only one action by the user. This one action is the user selecting one of the "one click" play list buttons. In one embodiment, after the steps of FIG. 20 have completed, the music player automatically plays the songs identified on the play list.

The technology for creating and updating play lists is described above in conjunction with a personal computer. However, the technology can also be implemented on music server 102, on another music player (including a head unit, another vehicle sound system, another mobile sound system, etc.), on another audio/visual device, on another computing device, etc.

Figure 21:
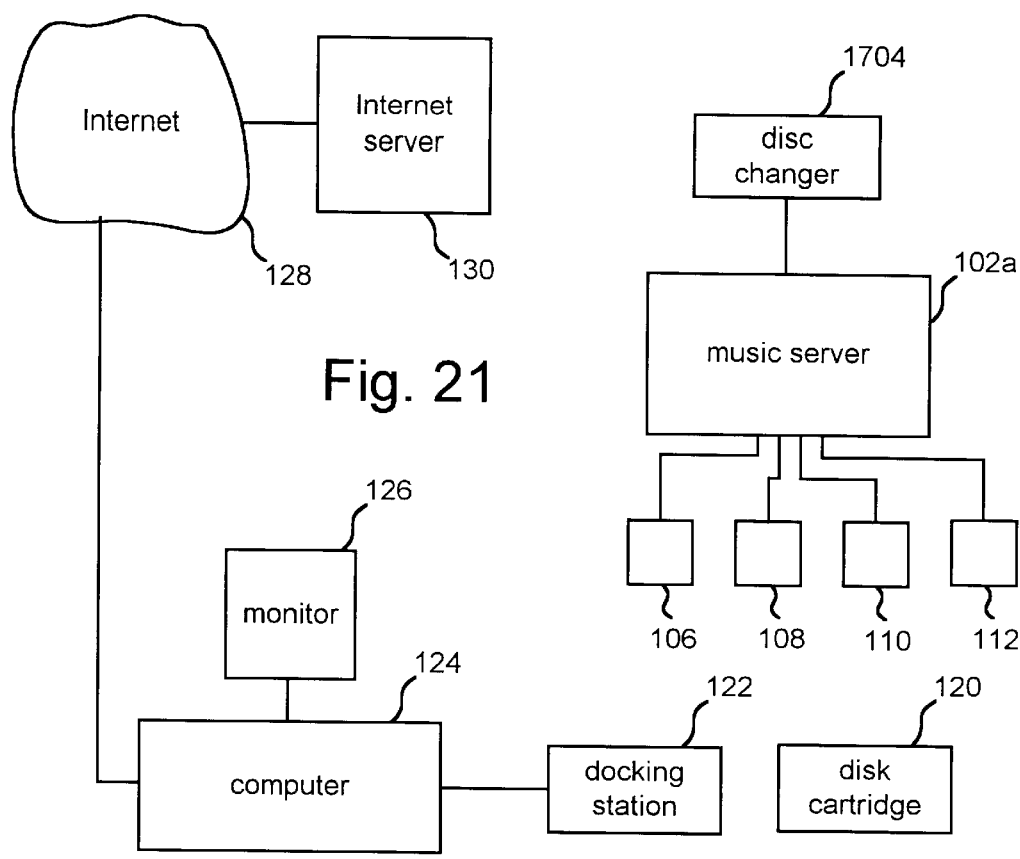
FIG. 21 is a block diagram of an alternative embodiment of the present invention.

FIG. 21 depicts an alternative embodiment of the present invention. Disk cartridge 120, docking station 122, computer 124, monitor 126, Internet 128 and Internet server 130 are the same as described above with respect to FIG. 1. Music server 102a is an alternative embodiment of music server 102. Music server 102a is an audio head unit adapted to be mounted in a vehicle and to be connected to speakers 106, 108, 110 and 112. Connected to music server 102a is disc changer 1704, which can be any standard disc changer known in the art. In one embodiment, disc changer 1704 can be music server 102. Disk cartridge 120 can be inserted into music server 102a so that music server 102a can play music files stored on disk cartridge 120. Alternatively, music server 102a can play music from disc changer 1704. In one embodiment, music server 102a includes a radio tuner. In the configuration of FIG. 21, music server 102a does not emulate a disc changer. Rather, music server 102a serves as a head unit in communication with disk changer 1704. The software on computer 124 discussed above will work with the embodiment of FIG. 21.

Figure 22:
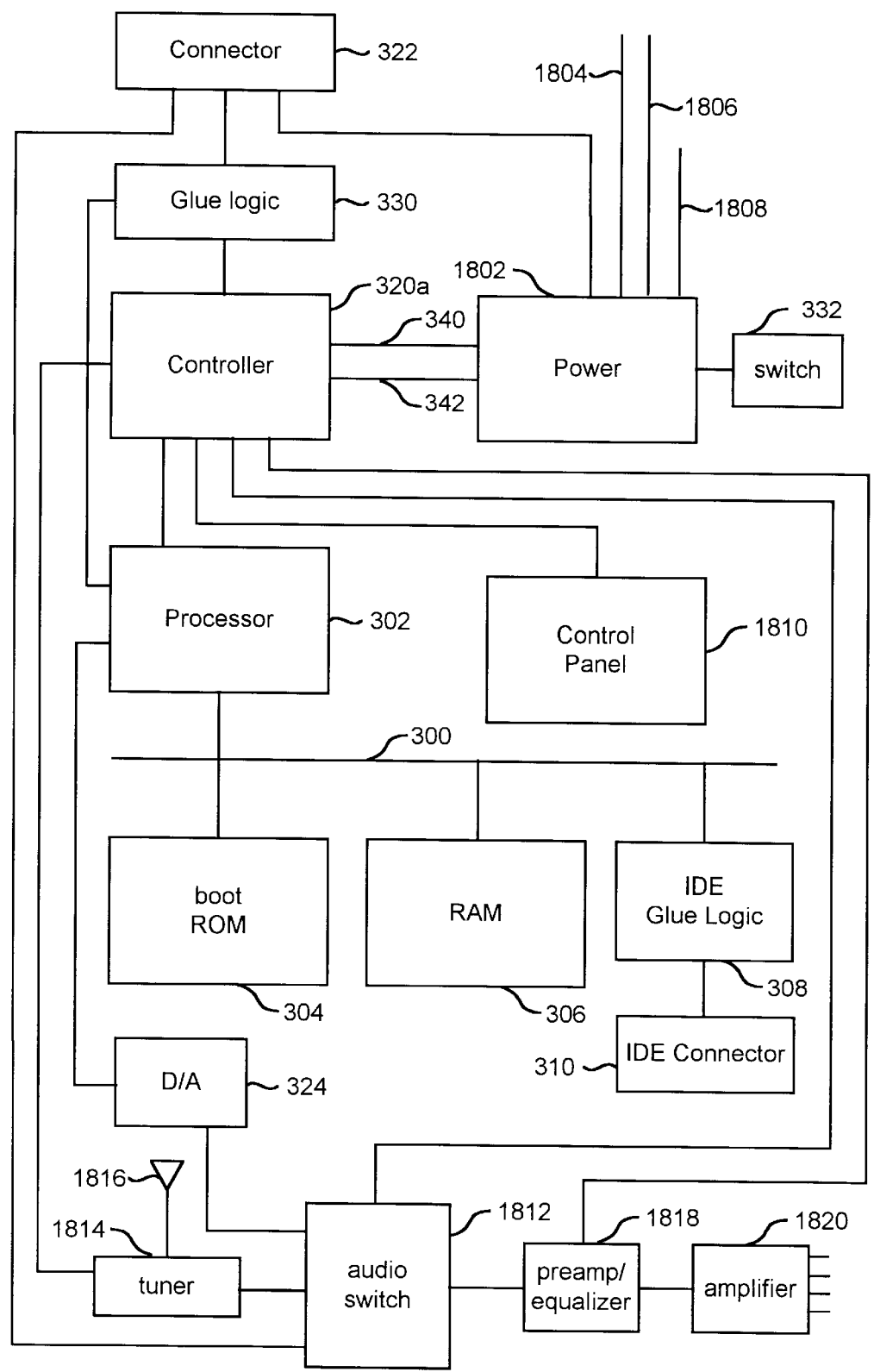
FIG. 22 is a block diagram of the components of an alternative embodiment of the music server.

FIG. 22 is a block diagram showing the components of music server 102a. Connector 322 connects to a cable that also connects to disc changer 1704. Connector 322 communicates the same signals in the configuration of FIG. 22 as it does in FIG. 6. Connector 322 also communicates with controller 320a and power module 1802. Power module 1802 sends a power signal and an accessory signal to connector 322, and provides power to the components of FIG. 22. Power module 1802 receives three signals 1804, 1806 and 1808 from the vehicle. Signal 1804 is a power signal from the vehicle's battery that is always on. Signal 1806 can either be an accessory signal or a power signal that is only on when the ignition key is set to the on position or the accessory position. Signal 1808 is ground and is connected to a grounded metal part of the vehicle. Power module 1802 also sends 5 volt power 340 and 12 volt power 342 to controller 320a. Switch 332 is connected to power module 1802 and operates as it does in the embodiment of FIG. 6.

Music server 102a includes a control panel 1810, which is a face plate with buttons, dials, knobs and a display screen for interaction with the user. Examples of buttons, dials and/or knobs on control panel 1810 include volume, base, treble, fade, balance, audio source (e.g. disc changer, disk cartridge 120, radio, etc.), tuner, seek, scan, play list selector, next play list, next song, next disc, etc. In one embodiment, control panel 1810 includes a play list selection button (or set of buttons) that can be used to access play lists on disk cartridge 120 and/or disc changer 1704. For example, each of the play lists on disk cartridge 120 can be numbered and each of the discs in disc changer 1704 can be numbered such that the numbers of the discs are different than the numbers of the play lists. Thus, each disc appears to be another play list. Alternatively speaking, each play list appears to be a different disc. For example, play list 1 through 10 could be play lists on disk cartridge 120 and play list 11 through 20 could be discs on disc changer 1704. One feature of one embodiment is that control panel 1810 includes controls (e.g. button, dial, knob, etc.) dedicated to operating disc changer 1704, controls dedicated to operating the player playing music from disk cartridge 120 and another set of controls dedicated to operating the radio. An example of a control dedicated to operating the disc changer is the next disc button. Control panel 1810 is connected to and communicates with controller 320.

As in FIG. 6, FIG. 22 shows processor 302, boot ROM 304, RAM 306, and IDE glue logic 308 connected to bus 300. IDE connector 310 is connected to IDE glue logic 308. Processor 302 plays music stored on disk cartridge 120 when disk cartridge 120 is connected to IDE connector 310. When processor 302 plays music, the music signal is sent to digital to analog converter 324. The output of digital to analog converter 324 is transmitted to audio switch 1812.

Tuner 1814 is connected to antenna 1816. Controller 320a also is connected to tuner 1814 in order to transfer commands to tuner 1814 based on control panel 1810. The output of tuner 1814 is connected to audio switch 1812. The output of disk changer 1704 is sent, via connector 322, to audio switch 1812. Audio switch 1812 receives a selection signal from controller 320a to determine which of the three sources are to be played through the speakers. The chosen source is sent to preamplifier/equalizer 1818. Controller 320a sends a signal to pre-amp/equalizer 1818 in order to change the volume, base, treble, fade, balance, etc. The output of pre-amp/equalizer 1818 is sent to amplifier 1820. Amplifier 1820 has a set of speaker output ports which are connected to the speakers. Thus, music server 102a can play music from three sources: disk cartridge 120, tuner 1814 or disc changer 1704.

Controller 320a is similar to controller 320 of FIG. 6. In order to allow music server 102a to communicate with various different disc changers, the communication between controller 320a and disc changer 1704 is controlled by the firmware stored in the flash memory of controller 320a, as discussed above. The user can use music server 102a with a different disc changer by changing the firmware as discussed above. Controller 320a can communicate with disc changer 1704 according to the state diagram of FIG. 11 and the packets of Table 1. However, the role of the controller, in regard to the state diagram with FIG. 11, is reversed for controller 320a as compared to controller 320. For example, controller 320a sends packet 1 after state 812 and receives packet 2 after state 1814, etc. Controller 320a issues commands to disc changer 1704 based on control panel 1810. Controller 320a and processor 302 operate very similar to the flow charts discussed above. One difference between the behavior of music server 102a and music server 102 is that controller 320 of music server 102 only receives commands from the user interface via the head unit. In regard to music server 102a, the commands from control panel 1810 are sent directly to controller 320a. The music data stored on disk cartridge 120 is the same for both the embodiment of FIG. 21 and the embodiment of FIG. 1.

When processor 302 plays the music files, it does so according to the play list selected on control panel 1810. In one embodiment, processor 302 can edit the play lists to add songs from the discs in the disc changer. For example, if the play lists have criteria set up for automatically adding songs, then processor 302 can add the songs from the disc changer that have properties satisfying the criteria of the play lists.

Figure 23:
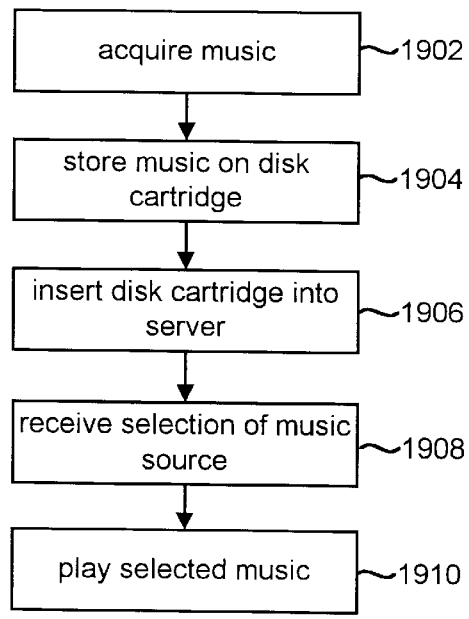
FIG. 23 is a flow chart describing the operation of an alternative embodiment of the present invention.

The embodiment of FIGS. 21–22 operates similar to the embodiment of FIG. 1. FIG. 23 is a flow chart describing the operation of the embodiment of FIGS. 21 and 22. A user acquires music (step 1902) and stores that music on disk cartridge 120, via docking station 122 (step 1904). Disk cartridge 120 is inserted into music server 102a (step 1906). Music server 102a receives a selection of a source of music of either disc changer 1704, disk cartridge 120 or tuner 1814 (step 1908). Music server 102a will play the music from the source requested by the user (step 1910). If the user selected music from disk cartridge 120, then processor 302 will access the music files on disk cartridge 120. The music files can be stored in a compressed or an uncompressed format as described above. Although the alternative embodiment is described in regard to a vehicle sound system, the same principles can be applied to other audio/visual systems.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for updating a play list, comprising the steps of:

comparing a set of one or more properties of a first track to criteria of a first play list; and automatically adding said first track to said first play list if said set of properties of said first track satisfy said criteria of said first play list.

2. A method according to claim 1, further including the step of:

detecting said first track being available, said step of comparing being performed automatically in response to said step of detecting.

3. A method according to claim 2, further including the step of:

downloading said first track from a global network, said step of detecting being performed in response to said step of downloading.

4. A method according to claim 2, further including the step of:

receiving said first track, said step of detecting being performed in response to said step of receiving.

5. A method according to claim 1, further including the step of:

receiving said criteria of said first play list.

6. A method according to claim 1, further including the step of:

accessing a set of tracks;

determining which tracks of said set of tracks have properties satisfying said criteria of said first play list; and automatically adding to said first play list said tracks having properties satisfying said criteria of said first play list.

7. A method according to claim 1, further including the steps of:

searching a memory device for tracks;

finding a set of tracks;

determining which tracks have properties satisfying said criteria of said first play list; and automatically adding to said first play list said tracks having properties satisfying said criteria of said first play list.

8. A method according to claim 1, wherein:

said first track is a file stored in mp3 format; and said properties of said first track are stored in an ID3 tag associated with said file.

9. A method according to claim 1, wherein:

said first track includes video.

10. A method according to claim 1, wherein:

said first track is a music file.

11. A method according to claim 1, wherein:

said set of properties of said first track is stored in a database.

12. A method according to claim 1, further including the step of:

receiving an indication that said first play list is to be stored on a playing device;

receiving a request to synchronize said first play list with said playing device; and synchronizing said first play list with said playing device.

13. A method according to claim 1, further including the steps of:

receiving a request to create said first play list;

associating an identification with said first play list; and receiving said criteria of said first play list.

14. A method according to claim 1, further including the steps of:

creating said first play list; and acquiring a set of one or more tracks, said set of tracks includes said first track, said step of comparing being performed in response to said step of acquiring.

15. A method according to claim 1, wherein:

said step of comparing includes comparing a date for said first track to a date for said first play list.

16. A method according to claim 1, wherein:

said step of comparing includes comparing tempo information for said first track to tempo information for said first play list.

17. A method according to claim 1, wherein:

said step of comparing includes comparing similarity information for said first track to similarity information for said first play list.

18. A method according to claim 1, wherein:

said step of comparing includes comparing bit rate information for said first track to bit rate information for said first play list.

19. A method according to claim 1, wherein:

said step of comparing includes comparing track length information for said first track to track length information for said first play list.

20. A method according to claim 1, wherein:

said step of comparing includes comparing track source information for said first track to track source information for said first play list.

21. A method according to claim 1, further including the step of:

receiving a request to create said first play list prior to said step of comparing.

22. A method according to claim 1, further including the step of:

receiving a request to update said first play list prior to said step of comparing.

23. A method of updating a play list, comprising the steps of:

comparing a set of one or more properties for a first track to play list criteria for a plurality of play lists; and automatically adding said first track to one or more of said play lists having play list criteria satisfied by said set of properties for said first track.

24. A method according to claim 23, wherein said step of comparing includes the steps of:

choosing a first play list from said plurality of play lists;

determining whether said set of properties for said first track satisfy play list criteria for said first play list; and repeating said steps of choosing and determining for each play list of said plurality of play lists.

25. A method according to claim 23, further including the step of:

detecting said first track being available, said step of comparing being performed automatically in response to said step of detecting.

26. A method according to claim 25, further including the step of:

downloading said first track from a global network, said step of detecting being performed in response to said step of downloading.

27. A method according to claim 25, further including the step of:

receiving said track, said step of detecting being performed in response to said step of receiving.

28. A method according to claim 23, further including the step of:

receiving play list criteria for at least one of said play lists.

29. A method for creating a play list, comprising the steps of:

receiving a request to generate a play list having predefined play list criteria; and automatically adding to said play list tracks having a set of one or more properties that satisfy said predefined play list criteria.

30. A method according to claim 29, wherein:

said step of automatically adding is performed in response to only a single action being performed by a user.

31. A method according to claim 29, further including the step of:

receiving and storing said predefined play list criteria.

32. A method according to claim 29, wherein:

said step of automatically adding includes determining which tracks from a set of tracks have properties satisfying said predefined play list criteria; and said set of tracks includes all files of a predetermined format stored on a storage medium.

33. A method according to claim 29, wherein:

said step of automatically adding includes determining which tracks from a set of tracks have properties satisfying said predefined play list criteria; and said set of tracks includes all files of a predetermined format identified in a list of tracks.

34. A method according to claim 29, wherein:

said tracks are audio files.

35. A method according to claim 29, wherein:

said tracks are mp3 audio files; and said properties are stored in ID3 tags.

36. A method according to claim 29, further including the steps of:

detecting a first track being available subsequent to said step of automatically adding;

comparing properties of said first track to said predefined play list criteria, said step of comparing being performed automatically in response to said step of detecting; and automatically adding said first track to said play list if said properties of said first track satisfy said predefined play list criteria.

37. A method according to claim 29, further including the step of:

automatically playing said tracks added to said play list.

38. A method according to claim 29, further including the steps of:

receiving a request to update said play list;

determining which new tracks have properties satisfying said play list criteria, and automatically adding to said play list said new tracks having properties satisfying said play list criteria.

39. A method according to claim 29, wherein:

said step of receiving a request includes receiving a request to generate multiple play lists, each play list having separate predefined play list criteria; and said step of automatically adding includes automatically adding to appropriate play lists of said multiple play lists tracks having properties satisfying said separate predefined play list criteria for said appropriate play lists.

40. A processor readable storage medium having processor readable code embodied on said processor readable storage medium, said processor readable code for programming a processor to perform a method comprising the steps of:

comparing a set of one or more properties of a first track to criteria of a first play list; and automatically adding said first track to said first play list if said set of properties of said first track satisfy said criteria of said first play list.

41. A processor readable storage medium according to claim 40, wherein said method further comprises the step of:

receiving said track, said step of comparing being performed in response to said step of receiving.

42. A processor readable storage medium according to claim 40, wherein said method further comprises the step of:

creating said first play list; and acquiring a set of one or more tracks, said set of tracks includes said first track, said step of comparing being performed in response to said step of acquiring.

43. A processor readable storage medium according to claim 40, wherein said method further includes the steps of:

receiving a request to generate said first play list, said criteria of said first play list being predefined, said step of receiving is performed prior to said step of comparing a set of one or more properties of a first track;

comparing properties of additional tracks to criteria of said first play list; and automatically adding to said first play list all additional tracks having properties satisfying said criteria of said first play list, said steps of comparing a set of one or more properties of a first track, comparing properties of additional tracks, and adding said first track and adding to said first play list are performed in response to only a single action being performed by a user.

44. A processor readable storage medium according to claim 40, wherein said method further includes the steps of:

receiving said criteria of a first play list;

receiving a request to generate said first play list, said step of receiving a request is performed prior to said step of comparing a set of one or more properties of a first track;

comparing properties of additional tracks to said criteria of said first play list; and automatically adding to said first play list all additional tracks having properties satisfying said play list criteria, said steps of comparing a set of one or more properties of a first track, comparing properties of additional tracks, adding said first track and adding to said first play list are performed in response to only a single action being performed by a user.

45. A processor readable storage medium according to claim 40, wherein said method further includes the steps of:

comparing said properties of said first track to criteria of additional play lists, and automatically adding said first track to a particular play list of said additional play lists if said properties of said first track satisfy said criteria of said particular play list.

46. A processor readable storage medium according to claim 40, wherein:

said tracks are audio files.

47. An apparatus for managing play lists, comprising:

an input interface;

a processor in communication with said input interface; and a processor readable storage medium in communication with said processor; said processor readable storage medium capable of storing program code for programming said processor to perform a method comprising the steps of:

comparing a set of one or more properties of a first track to criteria of a first play list, and automatically adding said first track to said first play list if said set of properties of said first track satisfy said criteria of said first play list.

48. An apparatus according to claim 47, wherein said method further includes the step of:

receiving said track, said step of comparing being performed in response to said step of receiving.

49. An apparatus according to claim 47, wherein said method further includes the steps of:

creating said first play list; and acquiring a set of one or more tracks, said set of tracks includes said first track, said step of comparing being performed in response to said step of acquiring.

50. An apparatus according to claim 47, wherein said method further includes the steps of:

receiving a request to generate said first play list, said criteria of said first play list being predefined, said step of receiving is performed prior to said step of comparing a set of one or more properties;

comparing properties of additional tracks to said criteria of said first play list, and automatically adding to said first play list all additional tracks having properties satisfying said play list criteria, said steps of comparing a set of one or more properties, comparing properties of additional tracks, adding said first track and adding to said first play list are performed in response to only a single action being performed by a user.

51. An apparatus according to claim 47, wherein said method further includes the steps of:

comparing said set of properties of said first track to criteria of additional play lists, and automatically adding said first track to a particular play list of said additional play lists if said set of properties of said first track satisfy said criteria of said particular play list.

* * * * *